Dec. 16, 1952     T. M. SCRUGGS ET AL     2,621,736
SLITTING AND WINDING APPARATUS
Filed Oct. 21, 1948     19 Sheets-Sheet 1

Thomas M. Scruggs,
Earl K. Hall,
Inventors,
Haynes and Koenig,
Attorneys.

Dec. 16, 1952 T. M. SCRUGGS ET AL 2,621,736
SLITTING AND WINDING APPARATUS
Filed Oct. 21, 1948 19 Sheets-Sheet 4

Thomas M. Scruggs,
Earl K. Hall,
Inventors,
Haynes and Koenig,
Attorneys.

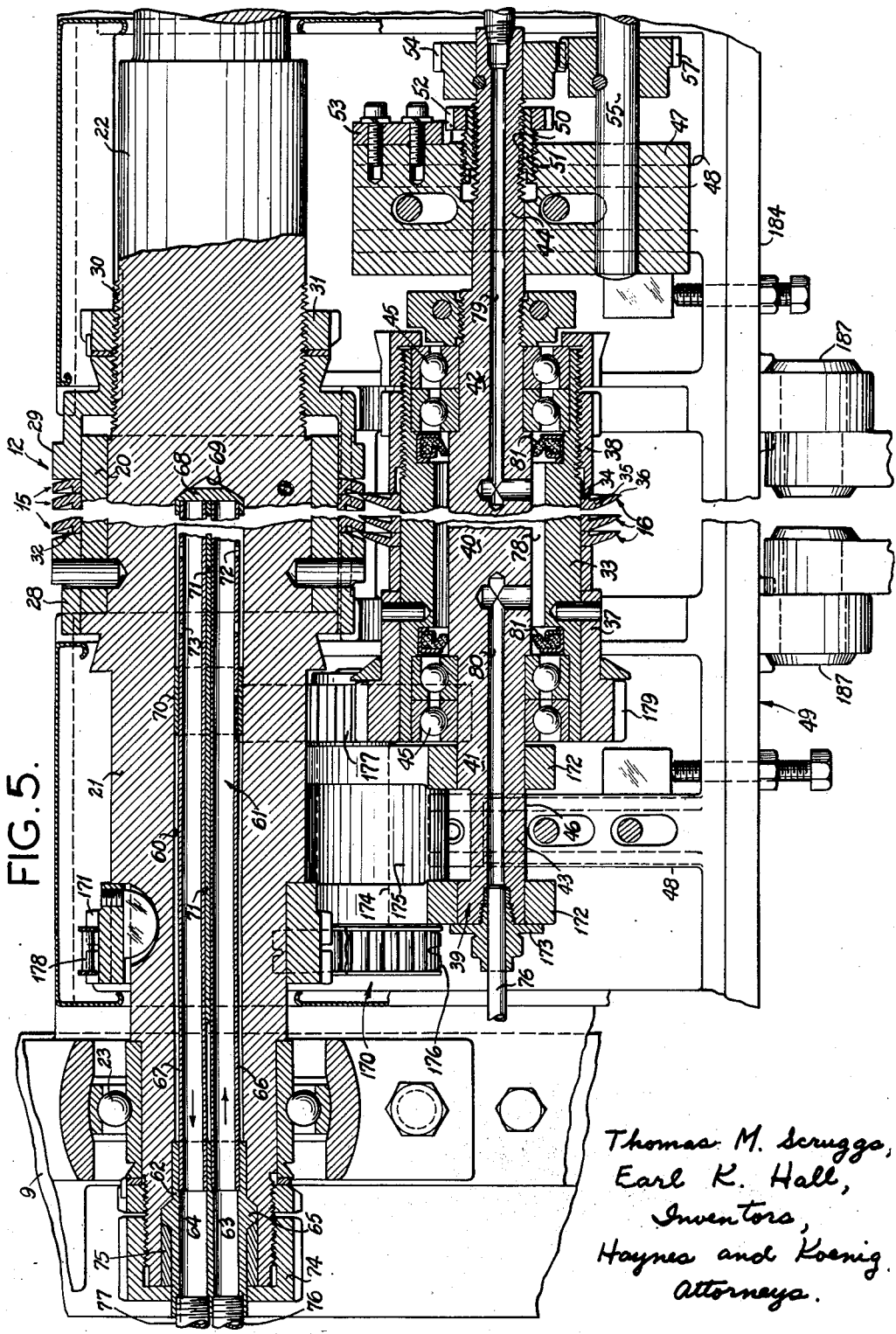

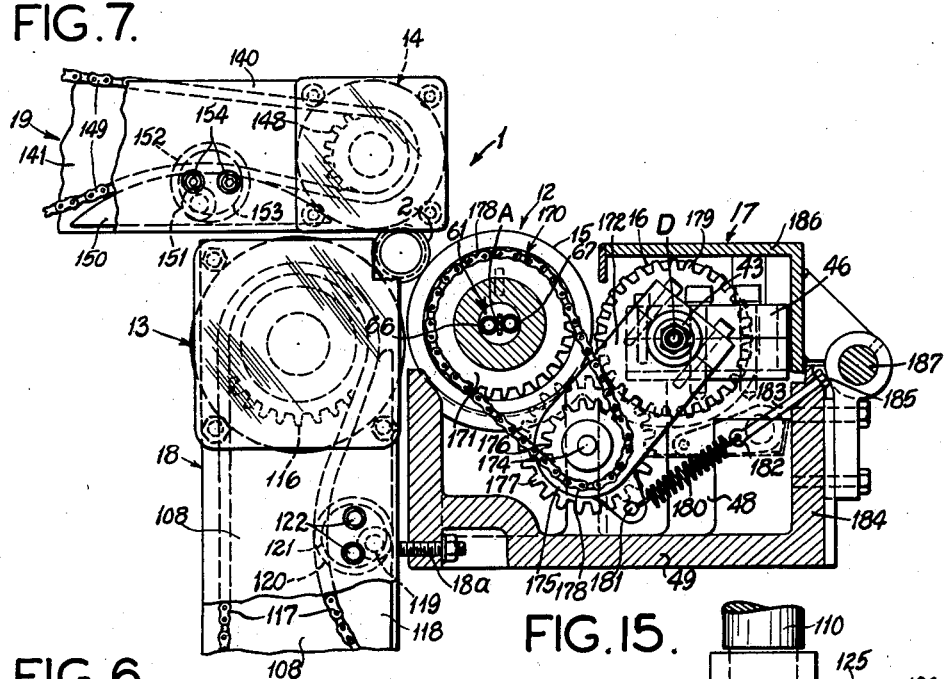

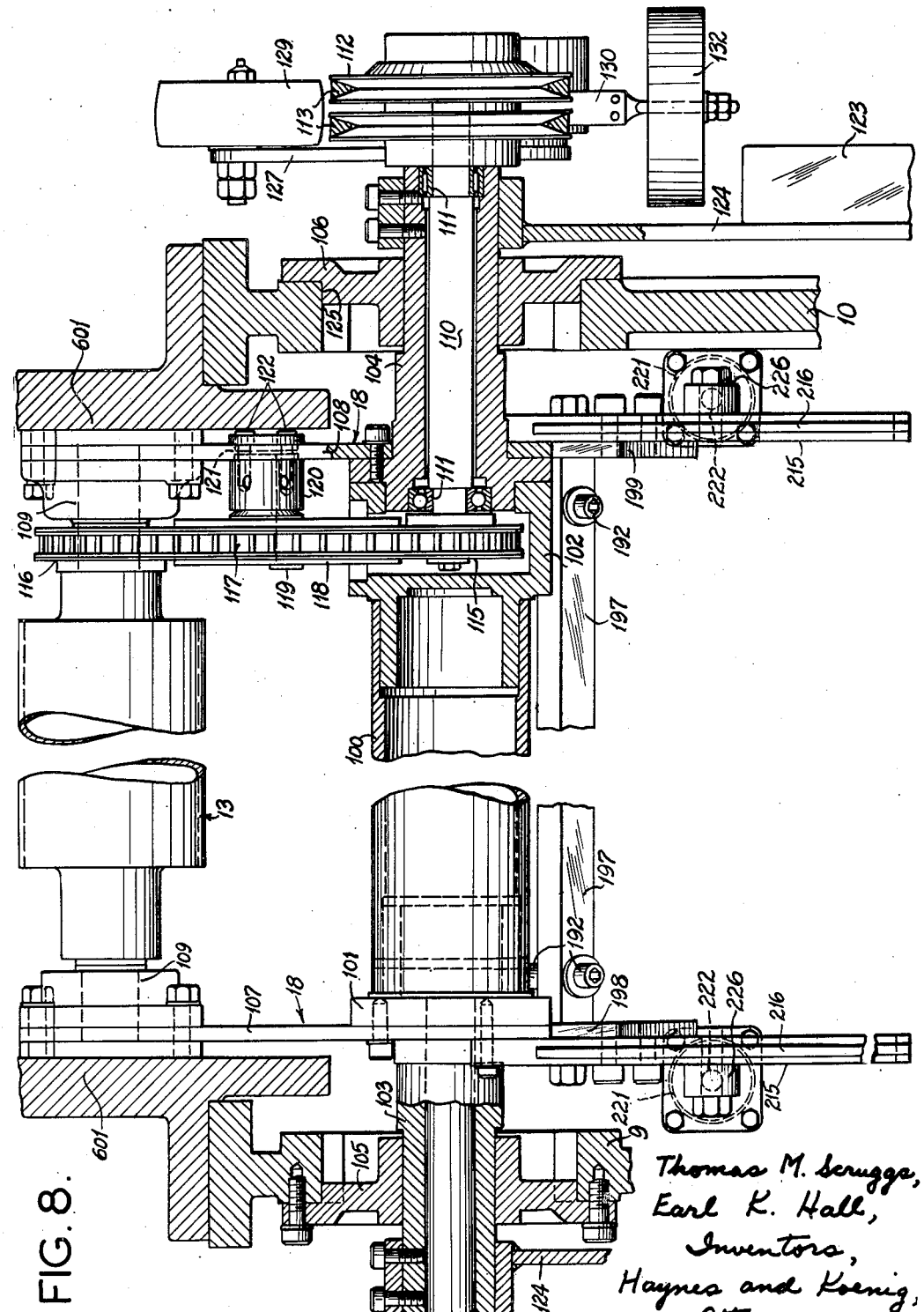

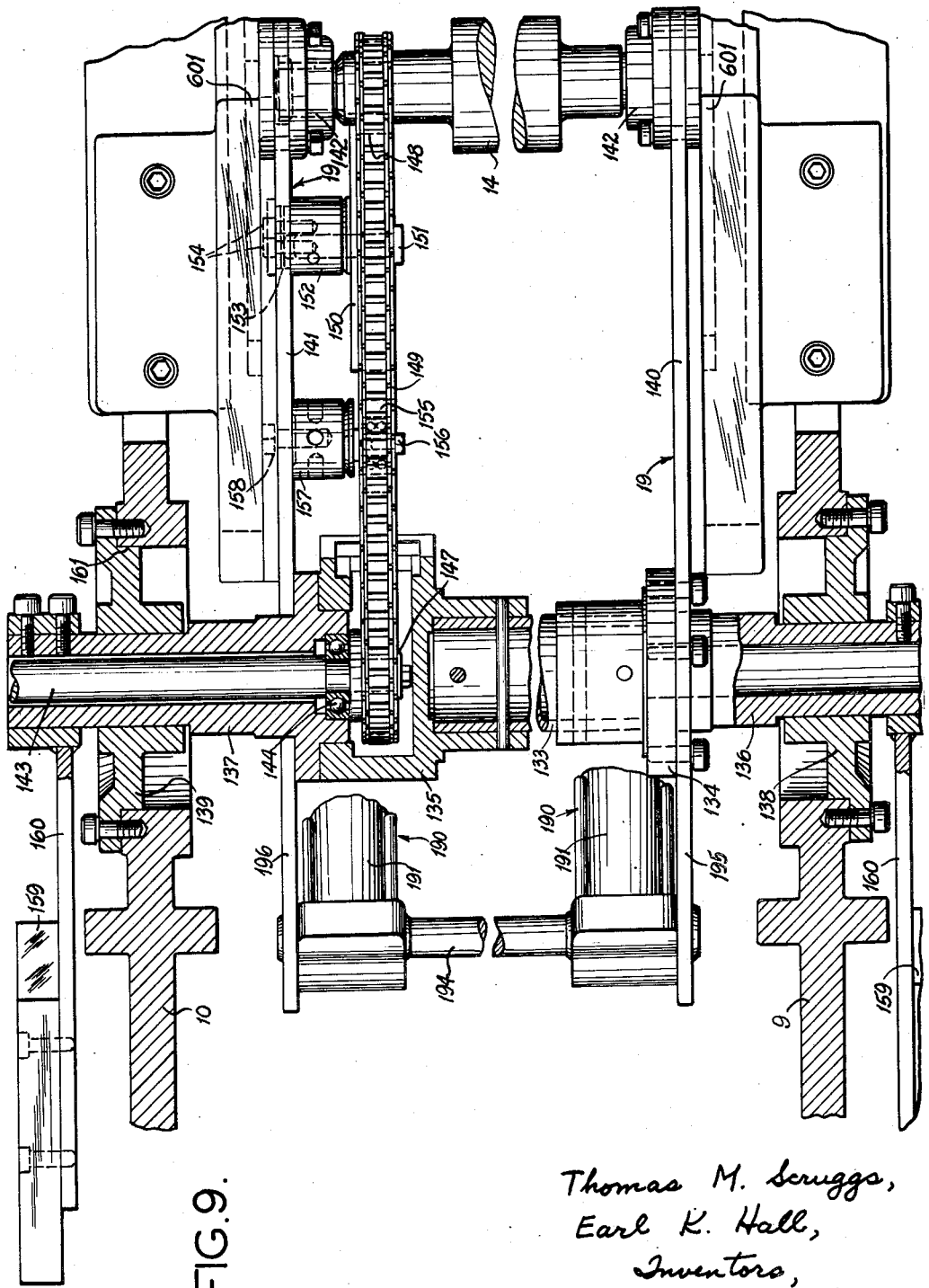

Dec. 16, 1952 T. M. SCRUGGS ET AL 2,621,736
SLITTING AND WINDING APPARATUS
Filed Oct. 21, 1948 19 Sheets-Sheet 9

Thomas M. Scruggs,
Earl K. Hall,
Inventors,
Haynes and Koenig.
Attorneys.

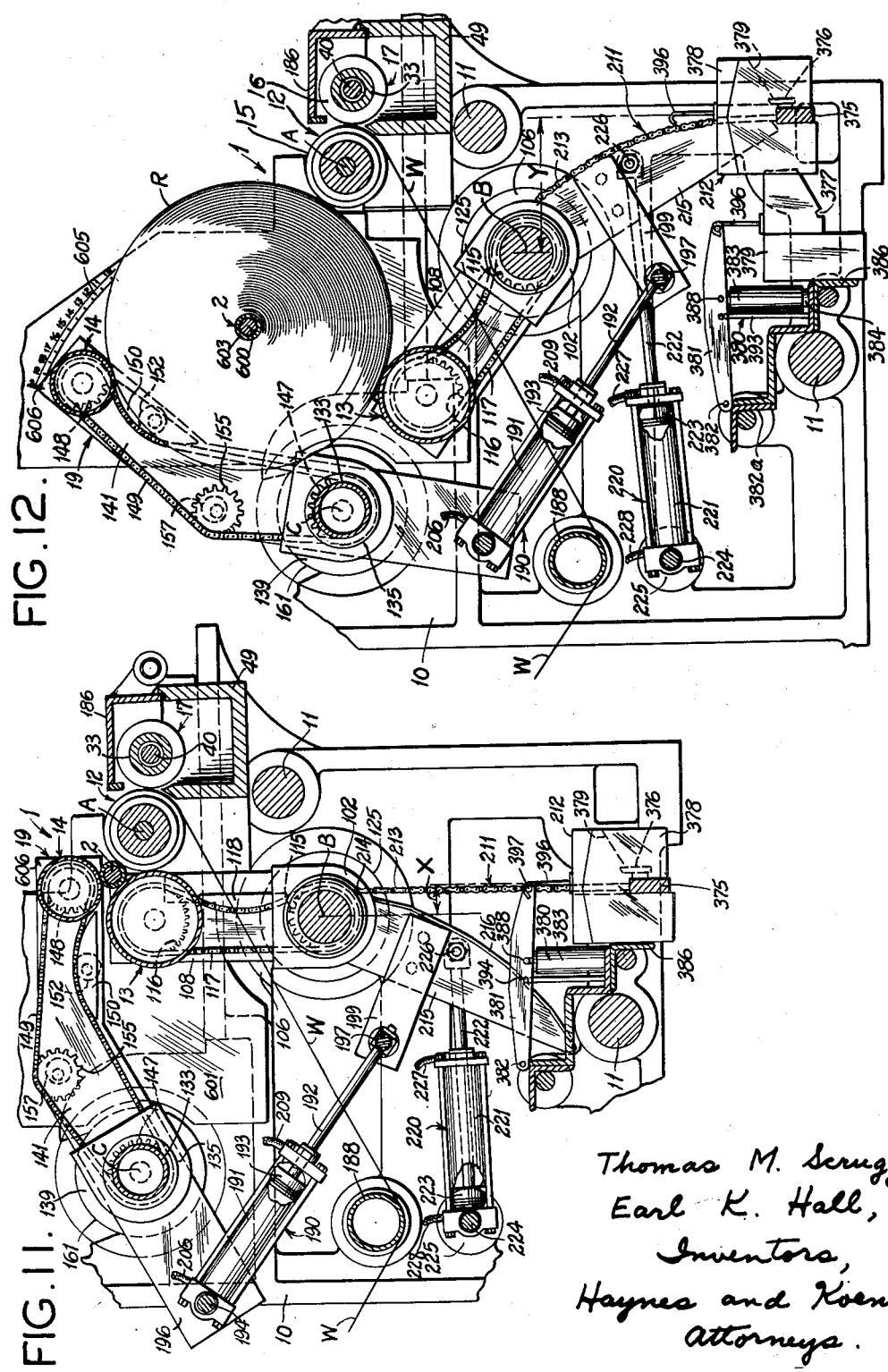

Dec. 16, 1952　　　T. M. SCRUGGS ET AL　　　2,621,736
SLITTING AND WINDING APPARATUS
Filed Oct. 21, 1948　　　19 Sheets-Sheet 11
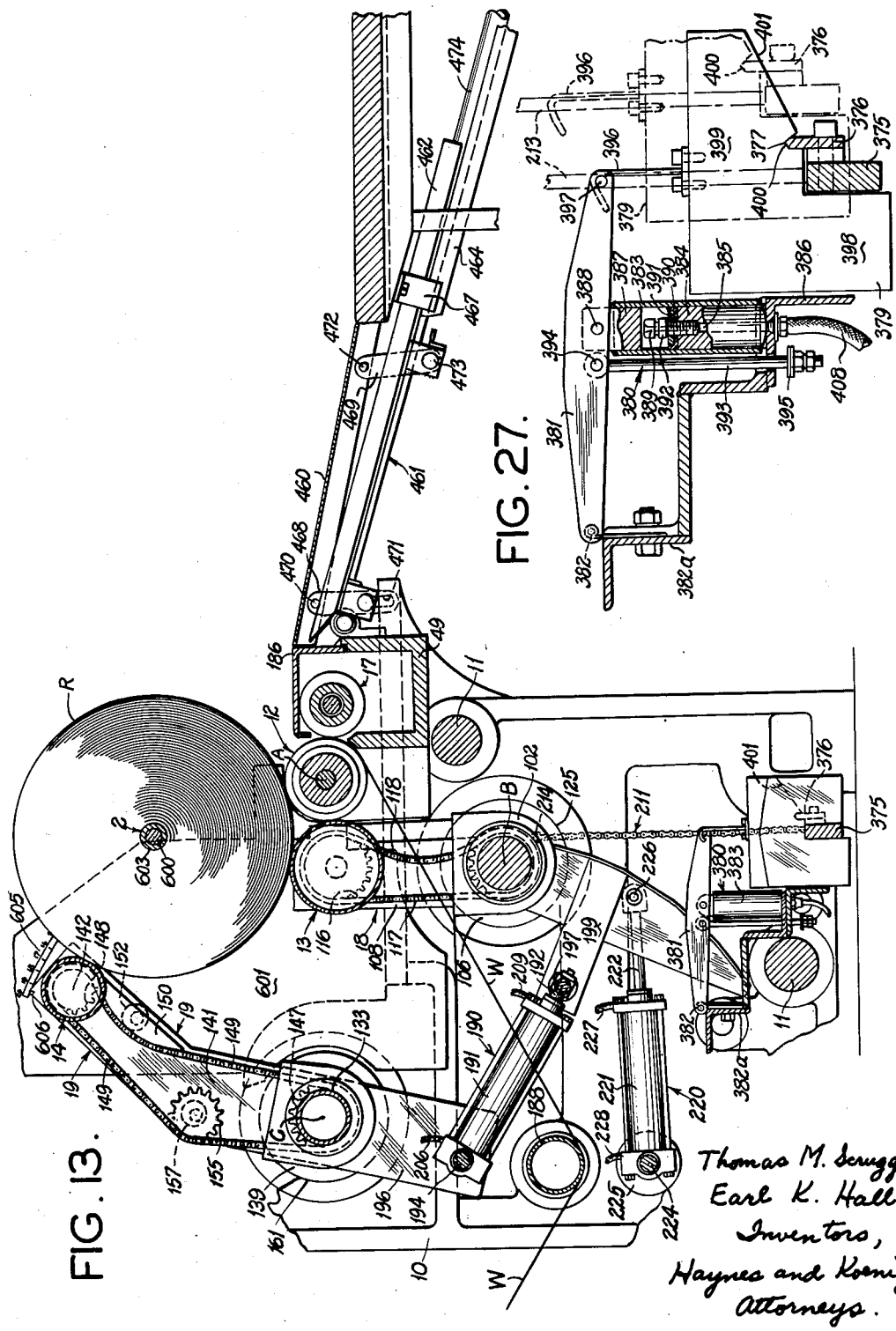

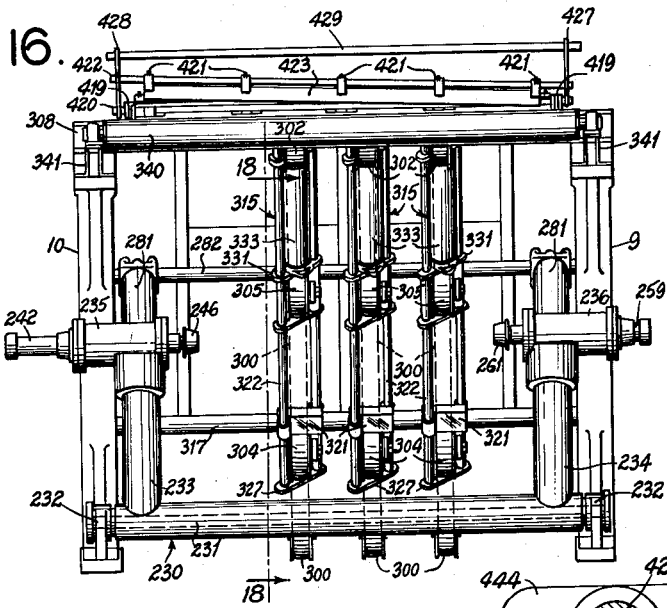
FIG. 16.
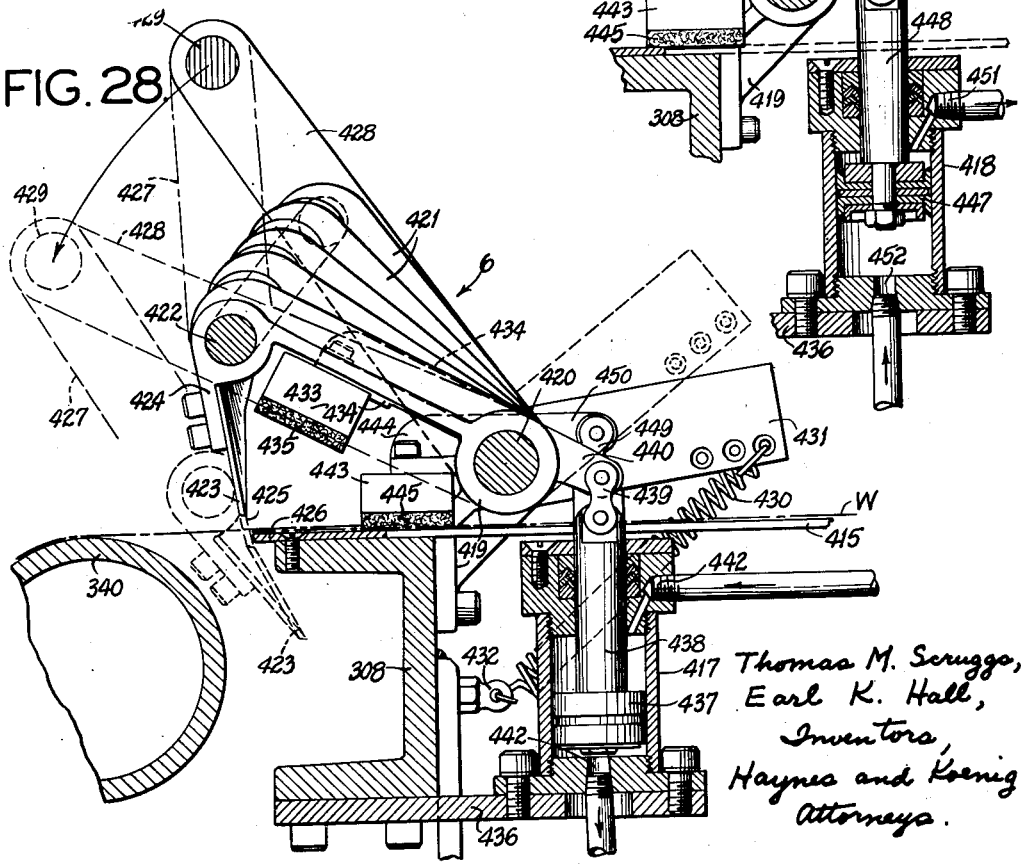
FIG. 29.
FIG. 28.
Thomas M. Scruggs,
Earl K. Hall,
Inventors,
Haynes and Koenig,
Attorneys.

Dec. 16, 1952  T. M. SCRUGGS ET AL  2,621,736
SLITTING AND WINDING APPARATUS
Filed Oct. 21, 1948  19 Sheets-Sheet 13

Thomas M. Scruggs,
Earl K. Hall,
Inventors,
Haynes and Koenig,
Attorneys.

Dec. 16, 1952 T. M. SCRUGGS ET AL 2,621,736
SLITTING AND WINDING APPARATUS
Filed Oct. 21, 1948 19 Sheets-Sheet 14
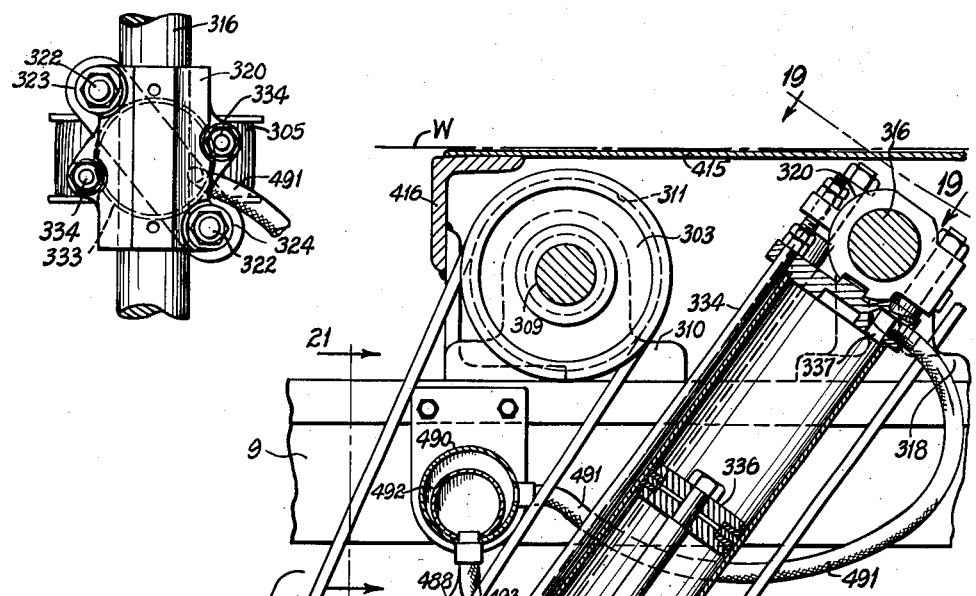
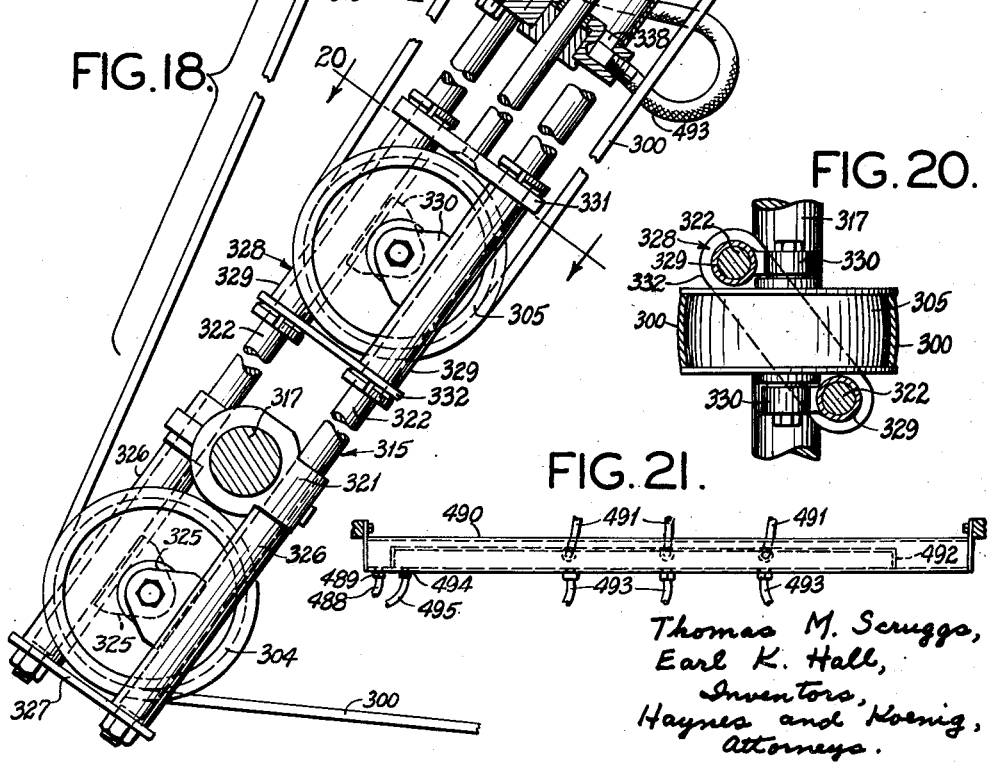
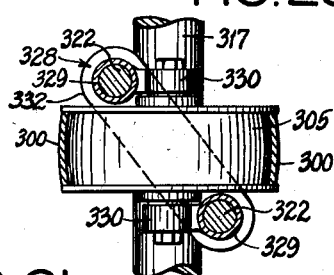
Thomas M. Scruggs,
Earl K. Hall,
Inventors,
Haynes and Koenig,
Attorneys.

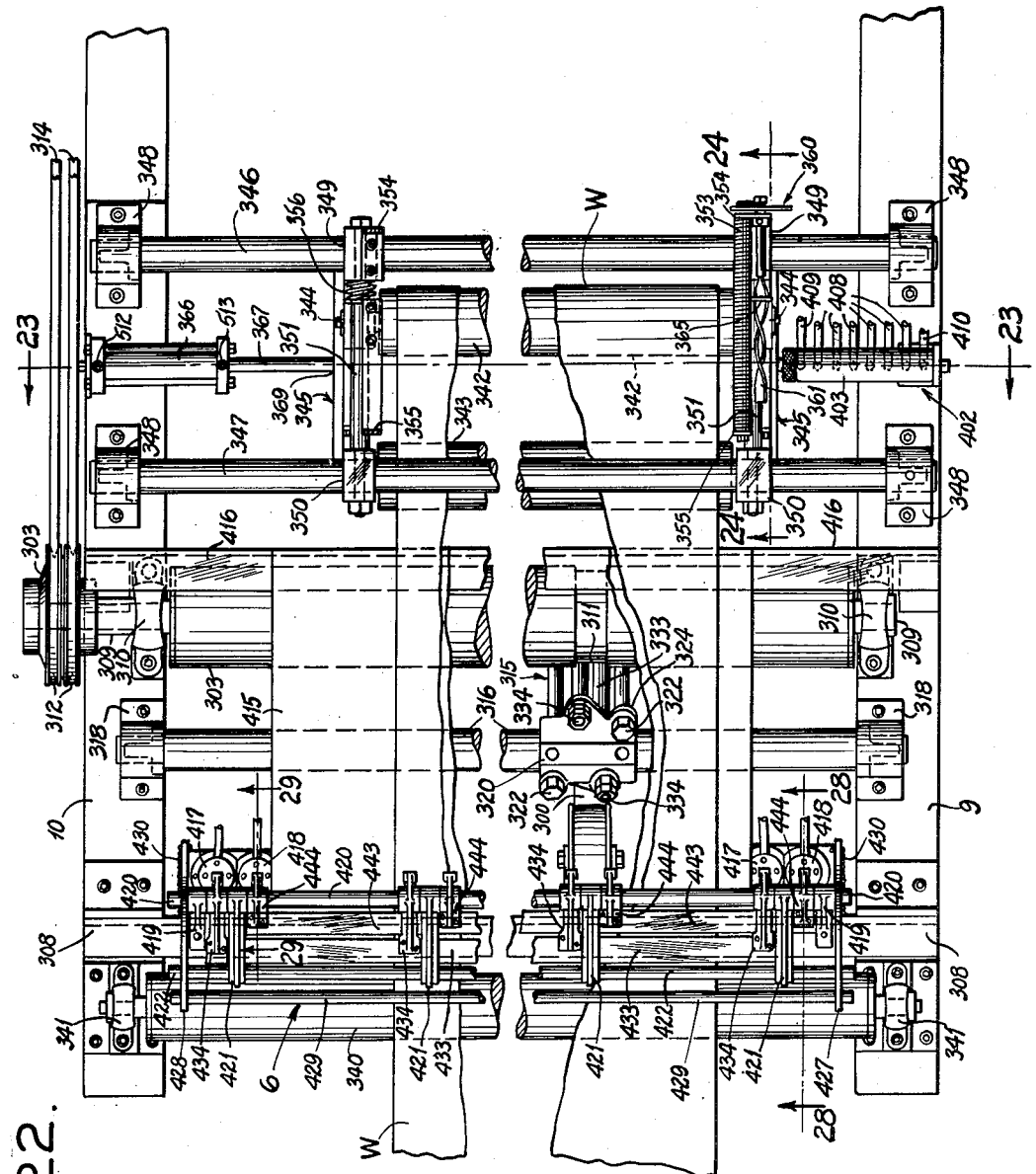

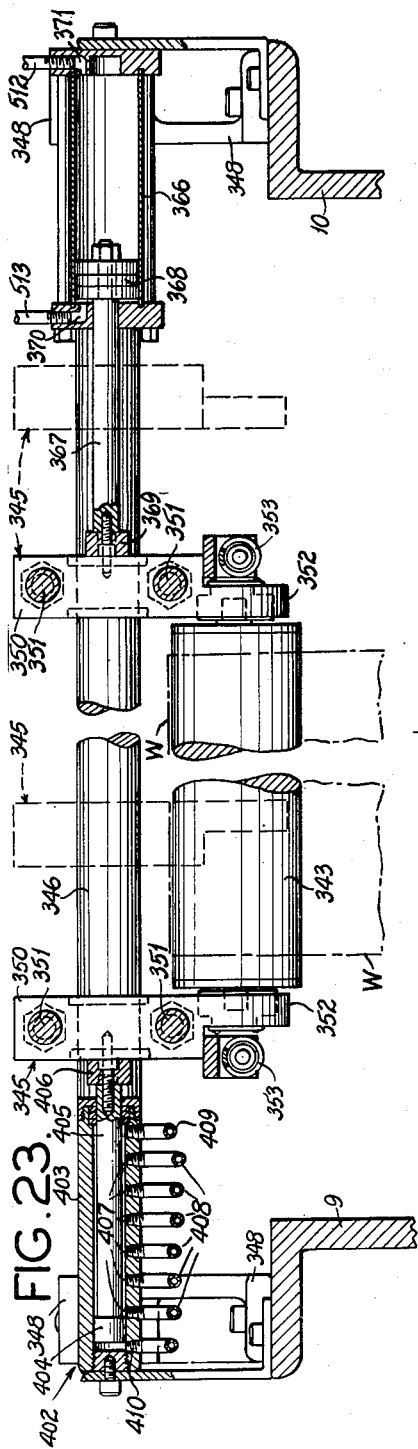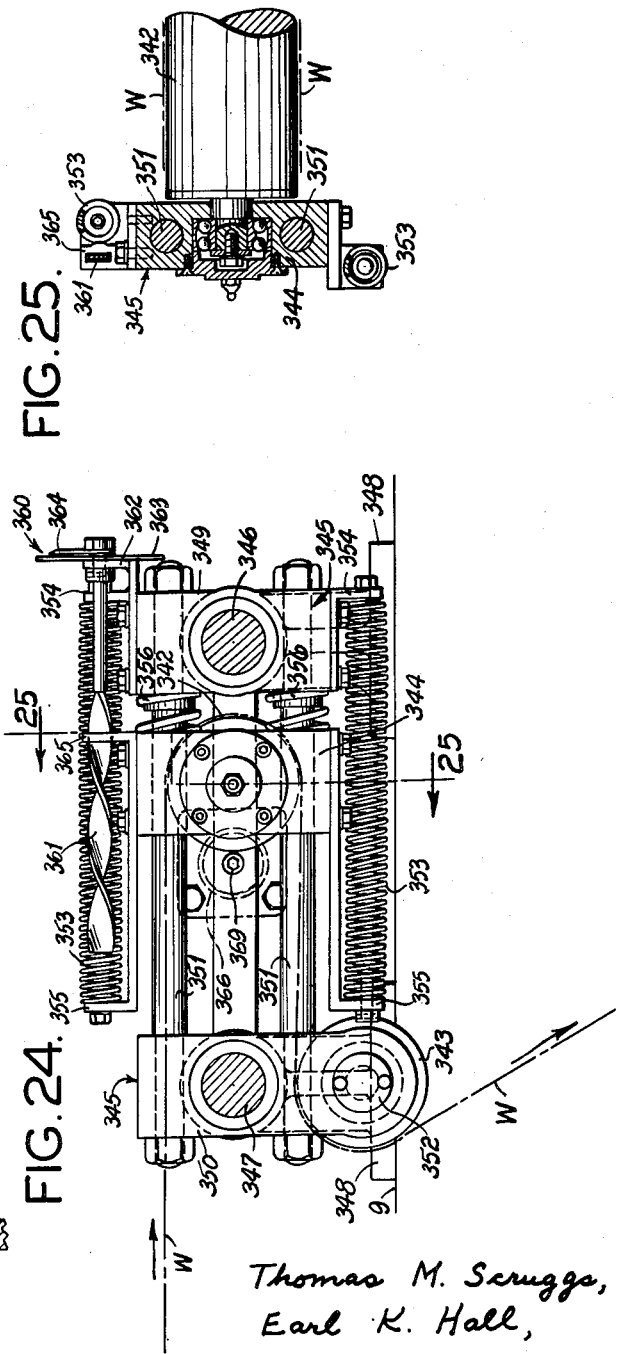

Dec. 16, 1952 T. M. SCRUGGS ET AL 2,621,736
SLITTING AND WINDING APPARATUS
Filed Oct. 21, 1948 19 Sheets-Sheet 17

Thomas M. Scruggs,
Earl K. Hall,
Inventors,
Haynes and Koenig,
Attorneys.

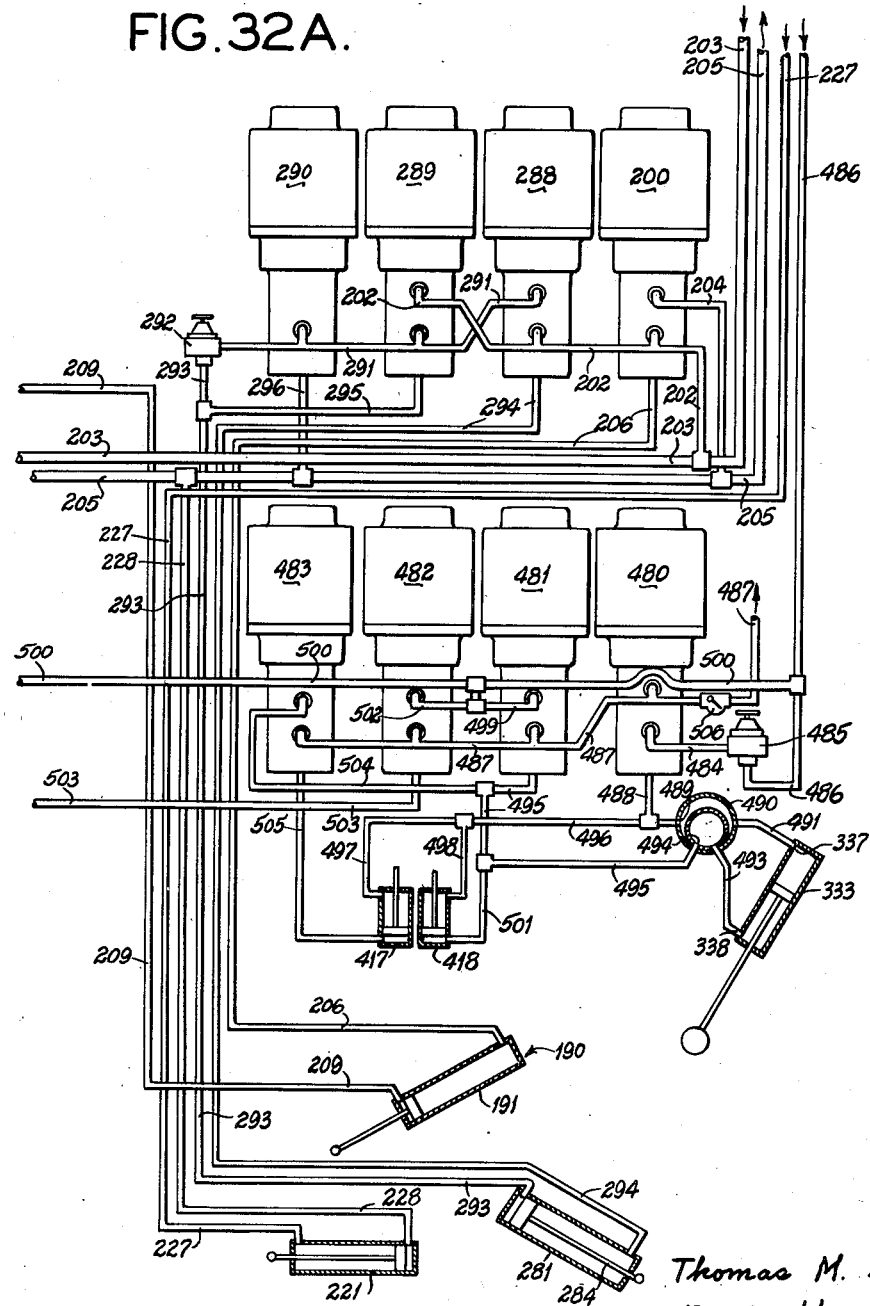

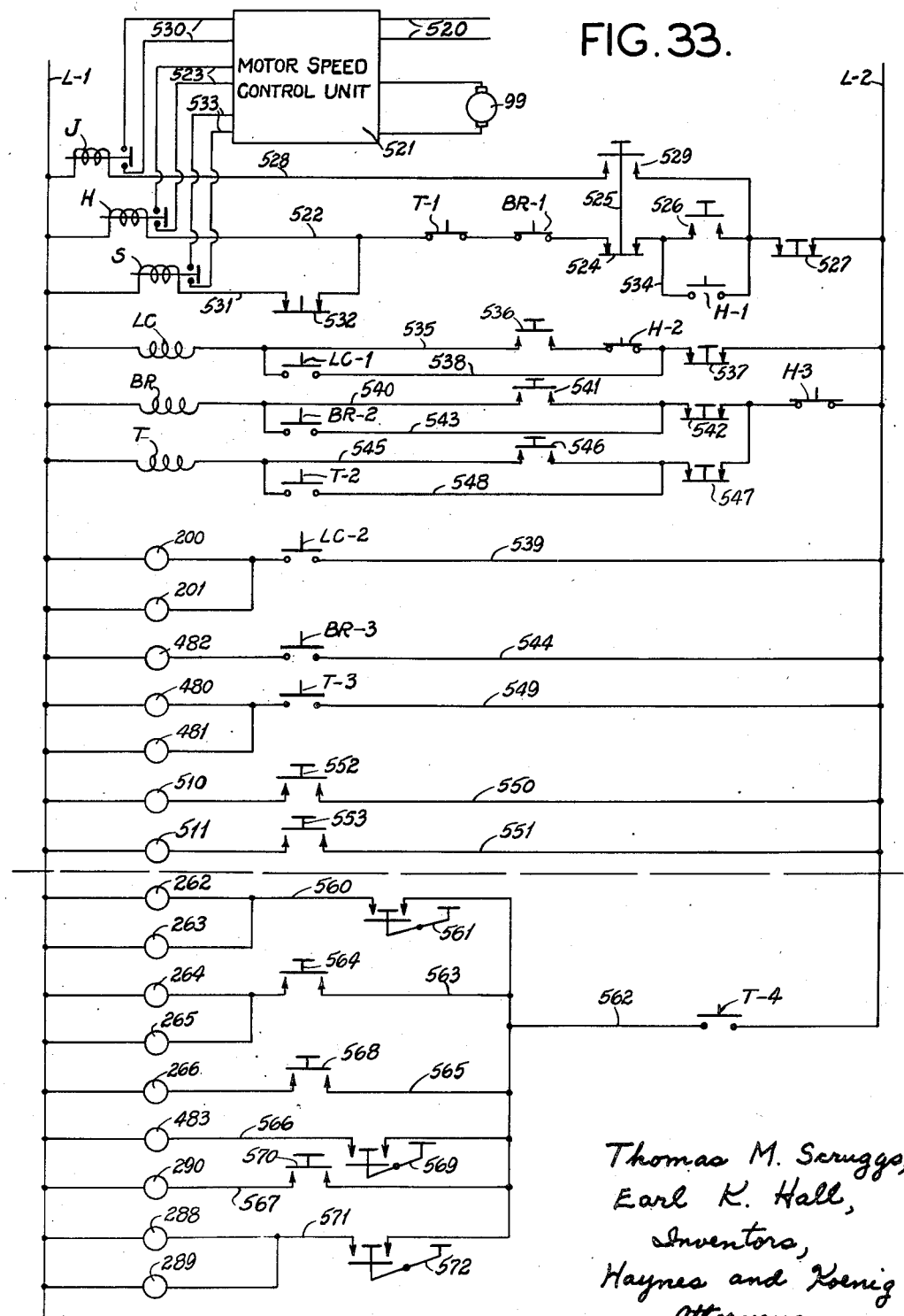

Patented Dec. 16, 1952

2,621,736

UNITED STATES PATENT OFFICE 2,621,736

SLITTING AND WINDING APPARATUS

Thomas M. Scruggs, Richmond Heights, and Earl K. Hall, Lemay, Mo., assignors to Bemis Bro. Bag Company, St. Louis, Mo., a corporation of Missouri Application October 21, 1948, Serial No. 55,804

29 Claims. (Cl. 164—65)

This invention relates to slitting and winding apparatus, and more particularly to such apparatus for slitting a web of paper into narrow strips and winding the strips into rolls.

Among the several objects of the invention may be noted the provision of an improved, high-speed slitting and winding apparatus for slitting a web of paper into narrow strips and winding the strips into tight, disc-like rolls, without requiring the strips to be laterally spaced from one another, so as to keep the over-all dimensions of the apparatus at a minimum; the provision of apparatus of the class described adapted to wind the strips side-by-side on an arbor without any lapping or sticking together of adjacent rolls of strip so that the rolls may be readily separated; the provision of apparatus of this class embodying a shearing type of slitter embodying means for moving its shearing cutters into and out of shearing relation without damage to the cutters; the provision of apparatus of this class embodying means for maintaining dimensional stability of the cutters to assure shearing alignment thereof; the provision of apparatus of this class adapted for quickly ejecting a completed group of strip rolls and starting the winding of another group of strip rolls; the provision of apparatus of this class adapted for quickly positioning fresh supply rolls of web and threading the end of a fresh supply roll through the apparatus; and the provision of apparatus such as described adapted for operation upon webs of different widths. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated:

Fig. 5 is a fragmentary enlargement of Fig. 4 to show detail;

Fig. 6 is a fragmentary detail enlargement of Fig. 5;

Fig. 7 is a vertical section taken on line 7—7 of Fig. 4;

Fig. 8 is an enlarged detail section taken on line 8—8 of Fig. 1;

Fig. 9 is an enlarged detail section taken on line 9—9 of Fig. 1;

Fig. 11 is a vertical longitudinal section taken on line 11—11 of Fig. 3 illustrating parts in position at the start of winding;

Fig. 12 is a section similar to Fig. 11 illustrating parts in position at the completion of winding;

Fig. 13 is a section similar to Fig. 11 illustrating parts in position for ejection of a wound roll;

Fig. 14 is a fragmentary detail elevation illustrating a belt tightener mechanism;

Fig. 15 is a plan view of Fig. 14;

Fig. 16 is a rearward end elevation of the apparatus of this invention;

Fig. 18 is an enlarged detail section taken on line 18—18 of Fig. 16 with parts broken away;

Fig. 19 is a view taken on line 19—19 of Fig. 18;

Fig. 20 is a section taken on line 20—20 of Fig. 18;

Fig. 21 is a reduced section taken on line 21—21 of Fig. 18;

Fig. 22 is a partial plan view of the apparatus as viewed from line 22—22 of Fig. 1, with parts broken away;

Fig. 23 is an enlarged section taken on line 23—23 of Fig. 22;

Fig. 24 is an enlarged section taken on line 24—24 of Fig. 22;

Fig. 25 is a section taken on line 25—25 of Fig. 24;

Fig. 27 is a section similar to Fig. 26 illustrating a moved position of parts;

Fig. 28 is an enlarged section taken on line 28—28 of Fig. 22;

Fig. 29 is an enlarged section taken on line 29—29 of Fig. 22;

Fig. 30 is a plan view of a bridge and its operating mechanism, parts being broken away;

Fig. 31 is a view of an arbor and rolls of strip wound thereon, parts being broken away and shown in section;

Figure 32:
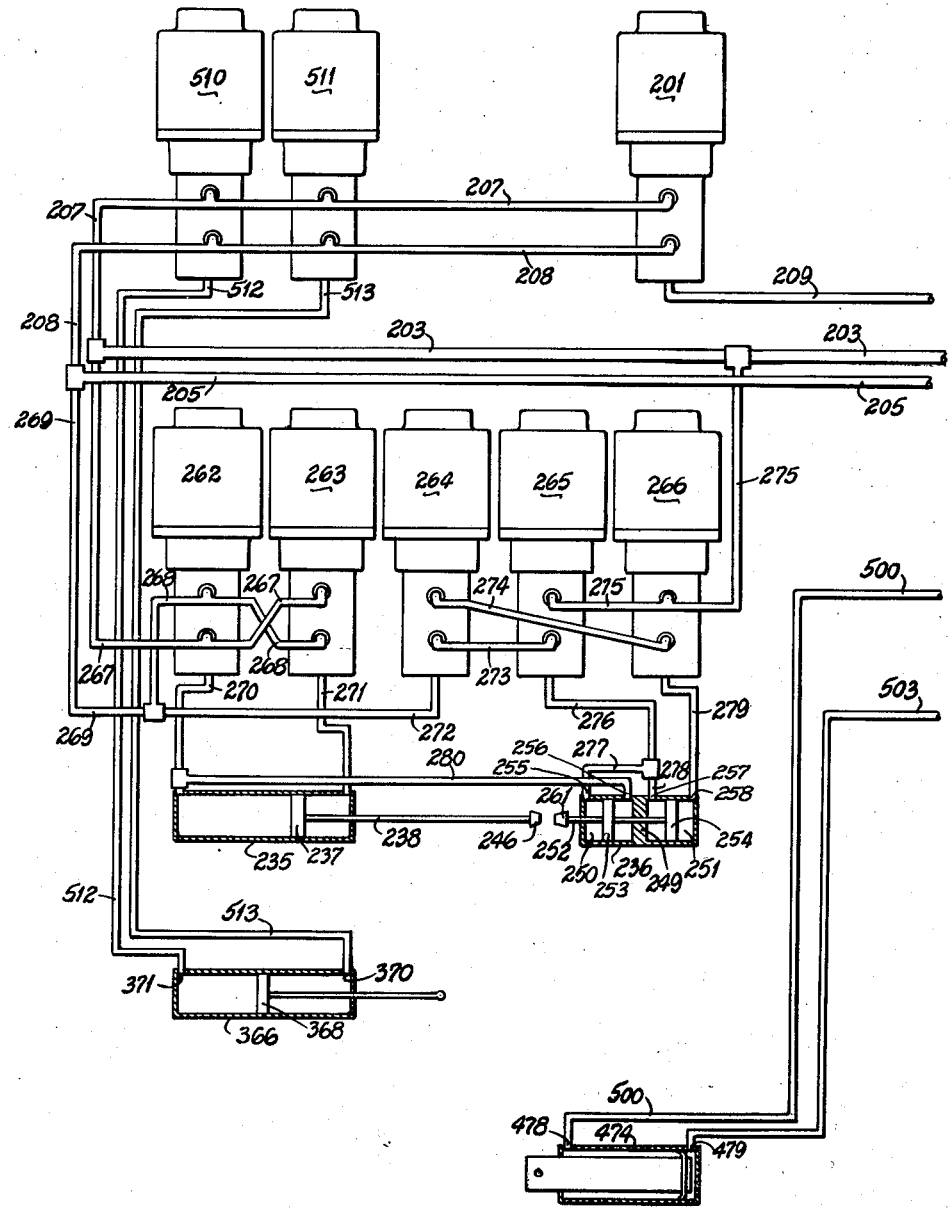

Figs. 32 and 32A constitute a fluid pressure system diagram; and

Fig. 33 is a wiring diagram.

Similar reference hcaracters indicate corresponding parts throughout the several views of the drawings.

Figure 1:
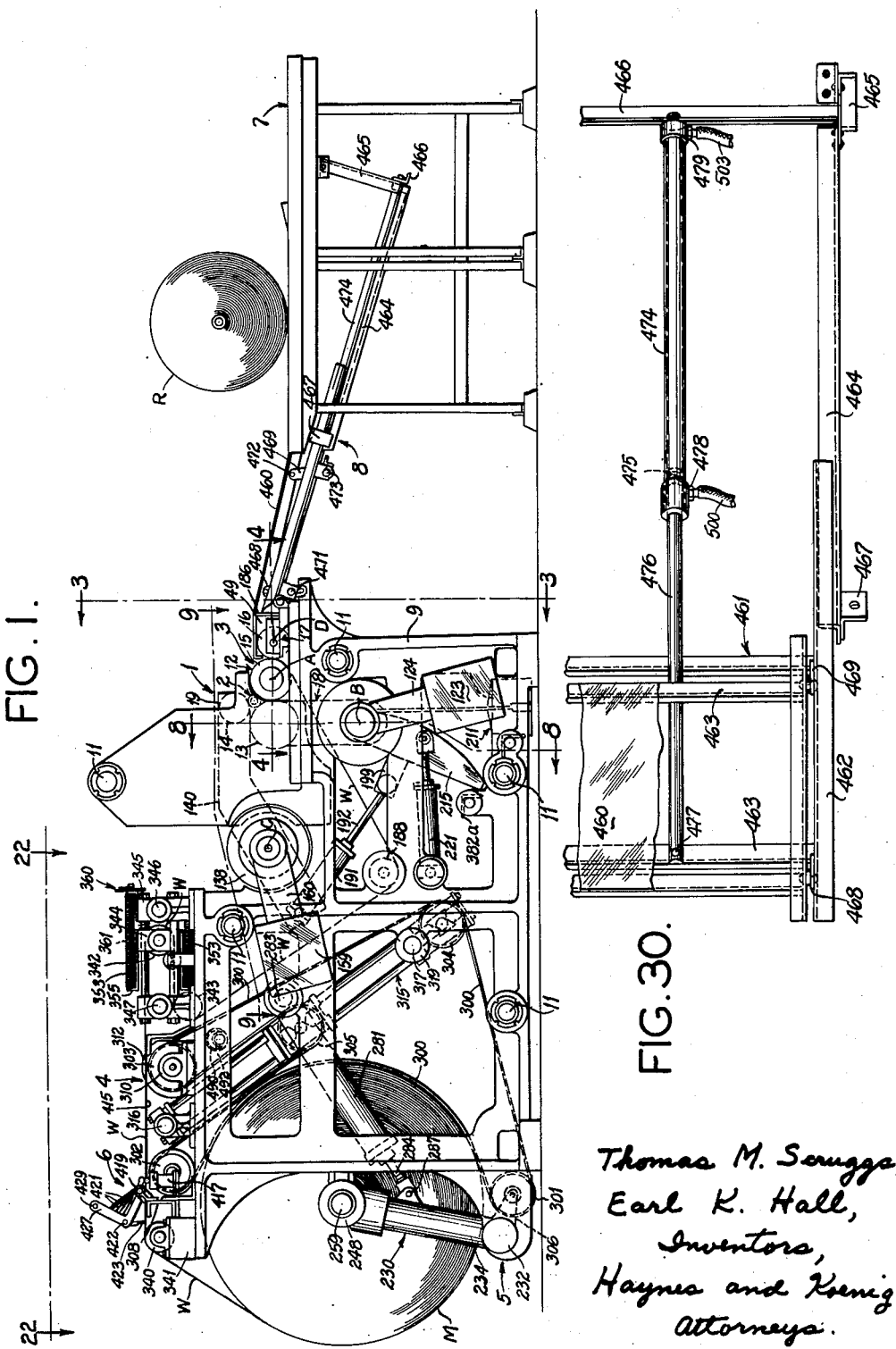
Fig. 1 is a left-hand side elevation of the slitter and winder of this invention.
Figure 2:
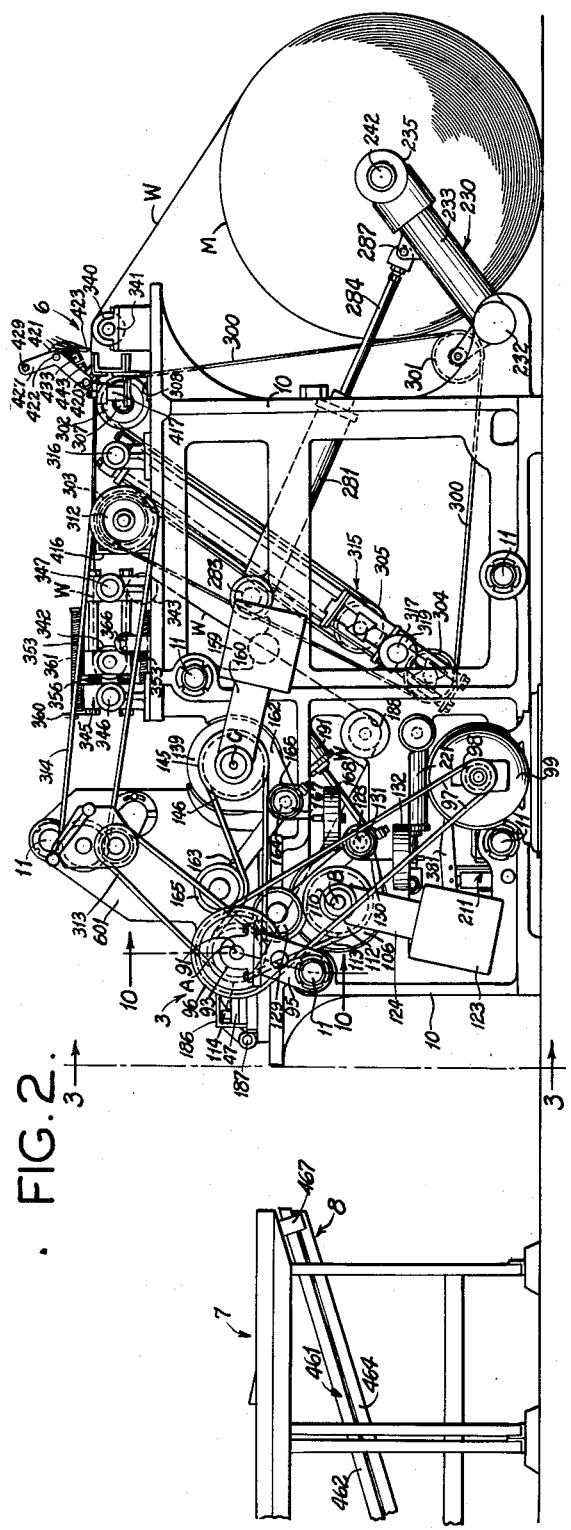
Fig. 2 is a right-hand side elevation.
Figure 3:
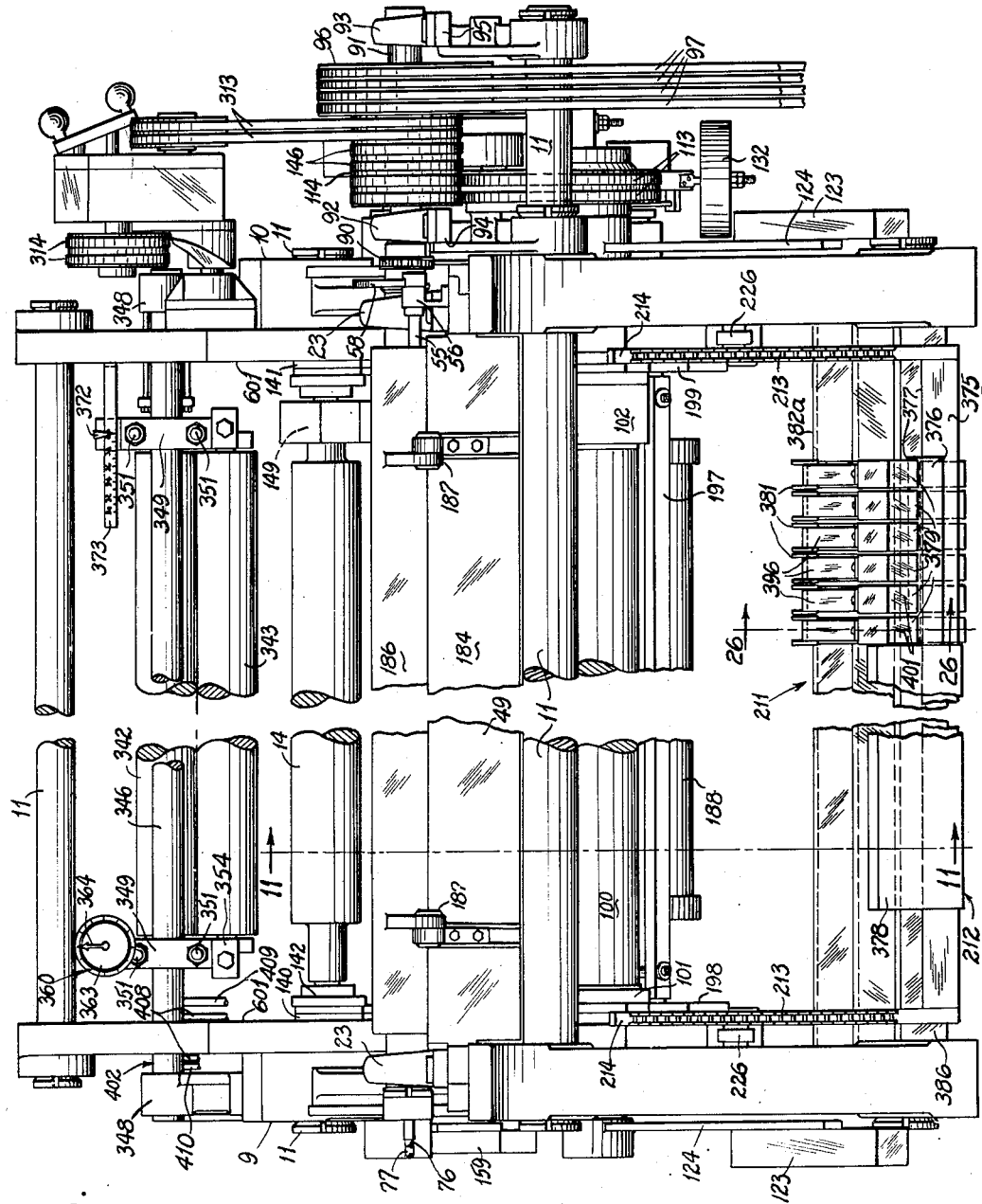
Fig. 3 is an enlarged forward end elevation as viewed from the line 3—3 in Figs. 1 and 2, parts being broken away.

Generally, the slitting and winding apparatus of this invention, as illustrated in Figs. 1–3, comprises a multiple drum friction drum type winder 1 for winding upon an arbor 2 narrow strips received from a rotary shear-type slitter 3. The latter embodies as one of its rotary shearing members one of the drums of the winder. It receives web W from web supply apparatus 4 including a stand 5 for holding a web supply or mill roll M in position for unwinding. At 6 is shown a web cutting and clamping apparatus for facilitating attachment of the trailing end of an exhausting web supply to the leading end of a new roll for quickly threading a new web through the apparatus. Spaced from the winder 1 is a table 7 for receiving a completed wound strip roll R (Fig. 31), consisting of a plurality of narrow strips wound side-by-side upon the arbor 2, upon its ejection from the winder. The table is spaced sufficiently from the winder to provide room for an operator to stand between the table and the winder end of the apparatus, which is referred to as its forward end. Carried by the table is a retractable bridge 8 adapted to be moved from a retracted position under the table to an extended position bridging the space between the winder and the table and inclined downward toward the latter. The bridge is normally retracted during winding of a roll R to permit the operator to stand between the winder and the table, and is extended upon completion of a roll R to provide an inclined track for the latter to roll from the winder on to the table.

More specifically, the apparatus is shown to comprise spaced side frames, the left-hand frame as viewed from the forward end of the apparatus being designated 9, the right-hand frame being designated 10. The frames are rigidly connected by tie bars 11 for bracing purposes. The winder 1 comprises two traction drums or rolls 12 and 13 for peripherally supporting and frictionally driving the strip roll R and a rider drum or roll 14 adapted to bear upon the top of the roll R as it is wound on the arbor 2. The forward drum 12, hereinafter referred to as the traction cutter drum, is journalled for rotation on a fixed horizontal axis A. This drum, throughout its length engaging the roll R, has a series of axially spaced circular cutters 15 with annular grooves therebetween. Cooperating shearwise with cutters 15 are circular cutters or knives 16 on a knife roll 17. The drum 13, hereinafter referred to as the back drum, is journalled in the upper end of a frame 18 pivoted for swinging movement about a horizontal axis B back of and below the axis A. The rider drum 14 is journalled in the forward end of a frame 19 pivoted for swinging movement about a horizontal axis C farther back of and just above the horizontal plane through the axis A. All three drums 12, 13 and 14 are positively driven for frictionally driving the arbor 2 and roll R thereon cradled by the drums 12 and 13. The arrangement is such that as the strips are wound, drum 13 may swing in an arc back and away from drum 12 and rider drum 14 may swing in an arc up and away from the roll R to permit increase in diameter of the latter while maintaining widely-spaced three-point pressure contact therewith. The rider drum functions, in effect, to measure the diameter of the roll being wound.

As best shown in Figs. 4–7, the traction cutter drum 12 comprises an elongate hollow cylinder 20 having journals 21 and 22 pinned in its left- and right-hand ends, respectively, and extending outward from the ends of the cylinder through bearings 23. The cutters 15 are formed as individual elements, assembled side-by-side on the cylinder. Each cutter comprises a central cylindrical hub 24 (Fig. 6), having a sliding fit on the cylinder, and an annular flange 25 extending outward at one end of the hub and raked back toward the other end of the hub so as to be of hollow conical form. The circular edge 26 at the juncture of the interior conic surface of the flange and the cylindrical rim 27 of the flange provides an acute-angled shearing edge.

The cutters are assembled on the cylinder 20 with their hubs engaged end-to-end and with their flanges parallel, and are clamped in assembled relation between a collar 28 pinned to the left end of the cylinder and a collar 29 threaded on a threaded portion 30 of the right-hand journal 22. A lock nut 31 threaded on 30 backs up the collar 29 to lock it in place. As illustrated, the flanges 25 all rake toward the left end of the traction drum 12 with their shearing edges 26 spaced apart at equal intervals corresponding to the width of the strips into which web W is to be slit, and have annular grooves 32 therebetween for receiving the marginal edges of the knives 16. The spacing of the flanges is determined by the lengths of the hubs 24, all of which are of equal length where, as herein illustrated, all the strips are to be of equal width. The rims 27 of the flanges, which define the cylindrical periphery of traction drum 12, are of substantial width for presenting adequate cylindrical surface area for frictional driving engagement with the strip roll R.

As also best shown in Figs. 4–7, the knife roll 17 comprises an elongate hollow cylinder 33. Knives 16 are formed as individual elements assembled side-by-side on the cylinder. Each knife comprises a central cylindrical hub 34 (Fig. 6), having a sliding fit on the cylinder, and an annular tapered flange 35 extending outward at one end of the hub and angled back toward the other end of the hub so as to be of generally hollow conical form. The flange is ground adjacent its periphery to have an annular radial flat 36 and a knife edge. The knives are assembled on the cylinder 33 with their hubs engaged end-to-end and with their flanges parallel, and are clamped in assembled relation between a collar 37 pinned to the left end of the cylinder and a collar 38 threaded on the right end of the cylinder. As illustrated, the knives all rake toward the right with their flats 36 and knife edges spaced apart at equal intervals corresponding to the width of the strips into which web W is to be slit and consequently corresponding to the spacing of cutters 15. The spacing of the knives is determined by the lengths of their hubs 34, all of which are of equal lengths corresponding to the lengths of hubs 24 of the cutters. The right-hand marginal faces of the knives are adapted for sidewise engagement with the shearing edges 26 of the cutters 15.

Figure 4:
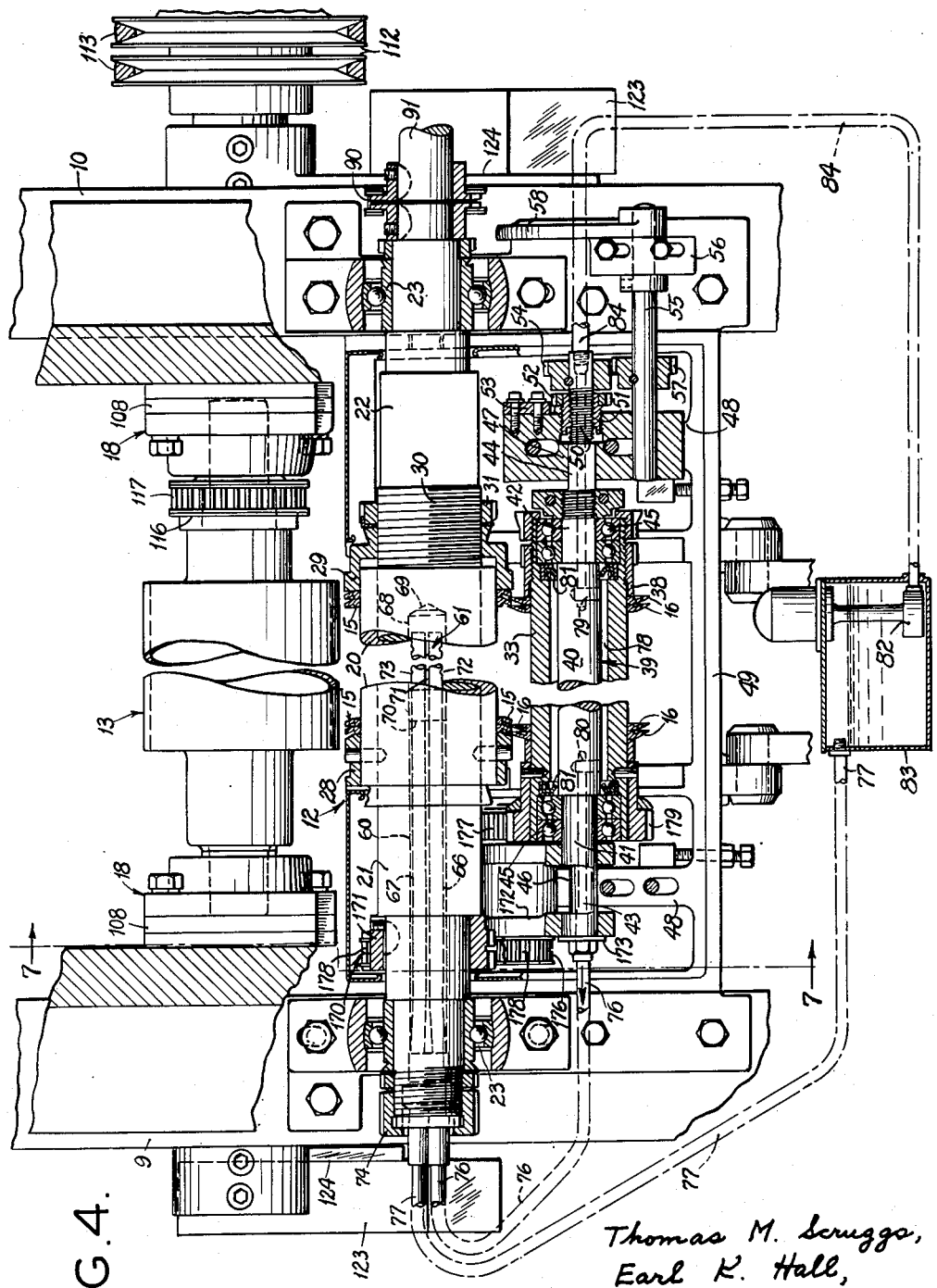
Fig. 4 is an enlarged horizontal section taken substantially on line 4—4 of Fig. 1 with parts broken away, also diagrammatically illustrating a heat-exchange fluid circulating system.

The cylinder 33 surrounds and is journalled for rotation around an eccentric shaft 39. As shown in Figs. 4 and 5, shaft 39 has a central section 40 within the cylinder and reduced-diameter sections 41 and 42 extending coaxially from the left- and right-hand ends of the central section, respectively. Section 41 is formed with an offset journal 43 spaced inward from its outer end. Section 42 has an offset journal 44, coaxial with 43, extending outward therefrom. The cylinder 33 is journalled on ball bearings 45 located within the ends of the cylinders surrounding shaft sections 41 and 42. The inner races of these bearings abut the shoulders at the ends of shaft section 40. Journals 43 and 44 are rotatable and axially slidable in left- and right-hand bearing blocks 46 and 47 fixed on posts 48 above the bottom of a cutter box 49 bolted to the side frames 9 and 10 (see particularly Figs. 4, 5 and 7). This mounts knife roll 17 for swinging movement in an arc about the axis D of the journals and for axial movement parallel to axis D. This axis is parallel to and so spaced forward of axis A of traction drum 12, and the throw of the eccentric shaft is such that the knife roll may be swung about axis D between a slitting position wherein the edges of knives 16 are received in grooves 32 in the traction drum, and a retracted position wherein the knives are spaced outward from the periphery of the traction drum.

Swinging movement of the knife roll 17 is accompanied by axial movement thereof, these movements being vectorially additive in such manner that as the knives 16 move radially toward the traction drum 12, they enter the grooves 32 before the side faces of the knives come into radial alignment with the shearing edges 26 of cutters 15, and then move toward the cutters until the side faces of the knives engage shearing edges 26. Axial movement of shaft 39 to cause axial movement of the knife roll 17 is effected by a screw mechanism in response to rotation of the shaft. As shown in Figs. 4 and 5, the right-hand journal 44 is provided with a screw section 50 rotary in a nut 51 adjustably fixed in the bearing block 47. The nut is adjustably threaded in a counterbore at the end of the bearing aperture in the bearing block and has an adjusting gear head 52 on its outer end. The nut is locked in adjusted position by a lock member 53 releasably fixed to the bearing block 47. A spur gear 54 is fixed on the end of journal 44. A shaft 55 journalled in the block 47 and in a bearing 56 on the side frame 10 carries a spur gear 57 in mesh with gear 54. On the end of shaft 55 outward of the bearing 56 is fixed a manual operating lever 58.

The knife roll 17 is moved between its slitting and retracted position by turning lever 58. When the lever is in its Fig. 4 position, the roll 17 is in its advanced slitting position with the edges of knives 16 entered in grooves 32 of the traction drum 12 and the side faces of the knives engaging the shearing edges 26 of cutters 15. To retract the knives, the lever is rotated through about half a turn counterclockwise as viewed from the right side of the apparatus. This rotates the shaft 39 clockwise, as viewed from the right, through shaft 55 and gears 57 and 54. Shaft 39 rotates through about half a turn and pivots knife roll 17 in an arc about axis D radially outward away from traction drum 12. As shaft 39 rotates, it is moved axially to the left since the screw section 50 of the journal 44 is driven to the left as it turns in the nut 51. It will be understood that the pivotal and axial movements of the knife roll are concurrent and actually result in such helical movement of the edges of the knives that the knives move axially to the left away from shearing edges 26 as the knives swing out of the grooves 32. To return the knives to slitting position, the lever 58 is swung back to its Fig. 4 position. This rotates shaft 39 counterclockwise, swinging knife roll 17 back toward the traction roll and moving it axially to the right. The knives 16 enter the grooves 32 well to the left of the respective shearing edges 26 and then swing to the right until they come into sidewise engagement with edges 26. With the knives axially as well as radially movable, and so controlled that they enter the grooves before moving axially into engagement with the cutters 15, there is no possibility of the knives engaging the rims 27 of the cutters. Thus, there is eliminated any possibility of damage to the knives and cutters upon movement of the knives into and out of shearing cooperation with the cutters.

To avoid misalignment of the mating cutters 15 and knives 16 which might be occasioned by differential axial thermal expansion and contraction of the traction drum 12 and the knife roll 17, it is most desirable to provide means for maintaining the drum 12 at a substantially constant temperature and also for maintaining the roll 17 at a substantially constant temperature so that their dimensions remain substantially constant throughout the operation of the apparatus. For this purpose, the drum 12 and knife roll 17 are constructed for circulation therethrough of a heat-exchange fluid, such as oil, to maintain their temperatures at definite predetermined values consistent with accurate alignment of the mating cutters and knives. As shown in Figs. 4 and 5, the left-hand journal 21 for the traction drum 12 has an axial bore 60 extending all the way through the journal from its outer end to its inner end within cylinder 20. Located in this bore and extending through cylinder 20 to the inner end of the other journal 22 is a fluid inlet and outlet pipe assembly generally designated 61.

The assembly 61 comprises a cylindrical head bearing 62 having longitudinal inlet and outlet passages 63 and 64 extending therethrough from one of its ends to the other. On the head 62 is a sealing ring or collar 65 having rotary sealing engagement with a shoulder at the inner end of a counterbore in the outer end of the journal 21. Inlet and outlet pipes 66 and 67 have their left-hand ends fixed in the inner ends of inlet and outlet passages 63 and 64. These pipes are of such length as to extend through the cylinder from within the left-hand journal 21 to the right-hand journal 22. At their right-hand ends, the pipes are closed by a cylindrical tail bearing 68 which has a bearing fit in a bore 69 in the inner end of the journal 22. The pipes extend through apertures in an intermediate bearing 70 having a bearing fit within bore 60. Between the head bearing 62 and the intermediate bearing 70, and between the latter bearing and the tail bearing 68, the pipes are fixed to spacer bars 71. Pipes 66 and 67, respectively, have longitudinal rows of holes 72 and 73 drilled through them at equally spaced intervals. These holes are progressively larger from the first holes adjacent the intermediate bearing 70 to the last holes adjacent the tail bearing 68.

The assembly 61 is removably held within the traction drum 12 by means of a gland nut 74 threaded up on the end of the journal 21 against a bushing 75 which bears against the sealing collar 65. The outer end of the head 62 projects out through the gland nut. The outer ends of inlet and outlet passages 66 and 67 are threaded for coupling fluid lines 76 and 77 thereto. The couplings hold the entire assembly 61 non-rotary in the traction drum 12.

As also shown best in Figs. 4 and 5, the outside diameter of the central section 40 of the eccentric shaft 39 is substantially less than the inside diameter of the knife roll cylinder 33 to provide an annular chamber 78 around the shaft within the roll for flow of fluid. Fluid inlet and outlet passages 79 and 80 are provided in the right- and left-hand ends of shaft 39, respectively. Passage 79 leads into the right-hand end of the annular chamber 78 from the end of journal 44 through the shaft sections 42 and 40. Passage 80 leads from the left-hand end of the annular chamber through shaft sections 40 and 41 to the outer end of the latter section. Rotary shaft seals 81 are provided at the ends of the chamber to prevent leakage of fluid from the chamber to the ball bearings 45. At 82 in Fig. 4 is shown a pump for pumping oil from a sump 83 through an oil line 84 connected to the inlet passage 79 in the right-hand end of the shaft 39. Oil flows through the knife roll 17 to the outlet passage 80 and thence through line 76 to the inlet passage 63 in the head 62 of assembly 61. From passage 63, it flows through pipe 66 into the traction drum 12 and out through pipe 67 and outlet passage 64 to line 77 which leads back to the sump 83. The oil may be circulated through a heat exchanger (not shown), if desired. Lines 76 and 84, which are connected to the knife roll, are flexible to permit movement of the latter. The oil circulating through the cutter drum 12 and knife roll 17 maintains them at substantially the same temperature. This eliminates thermal variations in their dimensions and insures equal pressures between the side faces of the knives 16 and the shearing edges 26 of the cutters 15. It is not essential that the drum 12 and roll 17 be maintained at the same temperature, or even at a constant temperature, but it is important that the differential of temperatures (if any) of these elements be maintained constant.

Figure 10:
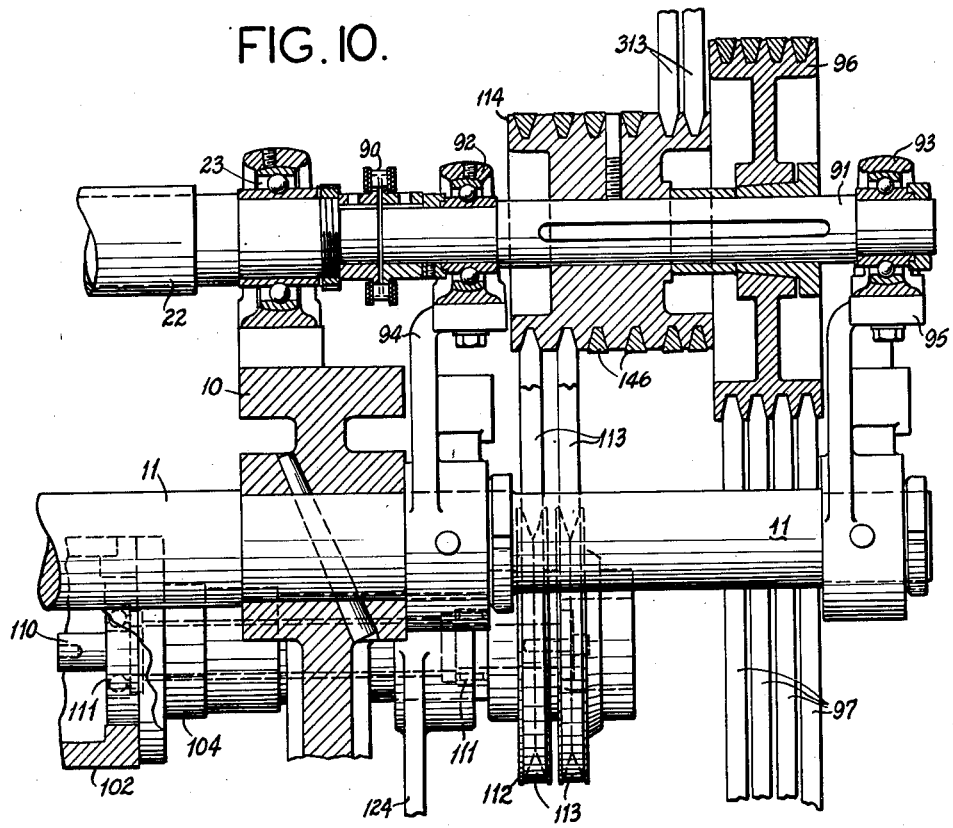
Fig. 10 is an enlarged detail section taken on line 10—10 of Fig. 2.

As previously pointed out, the traction cutter drum 12, the back drum 13 and the rider drum 14 are all positively driven. The knife roll 17 (cylinder 33 with knives 16 thereon) is also positively driven. As best shown in Figs. 3 and 10, the traction cutter drum 12 has its right-hand journal 22 directly coupled at 90 by a disconnectable coupling to the main drive shaft 91 of the apparatus. Drive shaft 91 is journalled outward of the right-hand side frame 10 and coaxial with drum 12 in an inner bearing 92 and an outboard bearing 93. These bearings are mounted on the upper ends of laterally spaced brackets 94 and 95 fixed to the end of the tie bar 11 which ties together the upper forward ends of the side frames 9 and 10 and which extends beyond the right-hand side frame 10. Fixed on drive shaft 91 adjacent outboard bearing 93 is a sheave 96 by means of which the shaft 91 is driven through belts 97 from a sheave 98 on the shaft of a motor 99 (Fig. 2). The latter drives main drive shaft 91 and the traction cutter drum 12 clockwise as viewed from the right-hand side of the apparatus.

As shown in detail in Fig. 8, the frame 18 carrying the back drum 13 comprises a shaft 100 having a flanged casting 101 at its left-hand end and a sprocket housing 102 at its right-hand end. Trunnions 103 and 104 extend outward from the casting and sprocket housing and are journalled in left- and right-hand bearings 105 and 106 in the side frames. These bearings locate the axis B. Arms 107 and 108 are fixed to the flanged casting and the sprocket housing, respectively. Drum 13 is journalled in bearings 109 in the upper ends of these arms on an axis parallel to the axis B. The right-hand trunnion 104 extending through the bearing 106 in the right-hand side frame is hollow and has a sprocket shaft 110 rotary therein. Shaft 110 is journalled in the trunnion 104 by means of bearings 111. On its outer end shaft 110 carries a pair of adjustable sheaves 112 by means of which it is driven through belts 113 from a sheave 114 fixed on the main drive shaft 91 (Fig. 10). On its inner end within the sprocket housing 102, shaft 110 carries a sprocket 115.

The back drum 13 carries a sprocket 116 adjacent its right-hand end in alignment with sprocket 115. A chain 117 is trained around sprockets 115 and 116 for driving the back drum. It will be seen that the drive for the back drum is such that it is driven clockwise as viewed from the right side of the apparatus, and preferably at a peripheral speed slightly greater than the peripheral speed of the traction cutter drum 12. The chain 117 rides on an arcuate tensioning shoe 118 (Figs. 7, 8 and 11–13) adjustably carried on the arm 108 by means of a pin 119 which extends eccentrically from a two-piece cylindrical clamping bracket 120 adjustably rotary in an aperture 121 in arm 108. Bracket 120 is adapted to be clamped in adjusted position in the arm 108 by screws 122.

Outward of the side frames 9 and 10, the trunnions 103 and 104 carry counterweights 123 for the back drum frame 18. These weights are at the lower ends of arms 124 fixed at their upper ends to the trunnions. The bearing 106 for the hollow trunnion 104 is formed as a bracket having an annular bearing portion 125 fixed in an aperture in the right-hand side frame 10 and a radial bracket arm 126 which extends downward and toward the back of the apparatus. Bracket arm 126 carries a belt tightener mechanism for the belts 113. As shown best in Figs. 2, 8, 14 and 15, this mechanism comprises an idler roll arm 127 pivoted at one end on a fixed pivot 128 at the outer end of bracket arm 126 and carrying at its other end an idler roll 129 bearing on the belts. The idler roll 129 is biased against the belts by its own weight and the weight of arm 127. The latter arm is braked by means of a friction band 130 fixed at one end to the arm 127, trained around a fixed brake drum 131 secured to the fixed pivot 128, and having a weight 132 on its other end.

As shown in detail in Fig. 9, the frame 19 carrying the rider drum 14 comprises a shaft 133 having a flanged casting 134 at its left-hand end and a sprocket housing 135 at its right-hand end. Trunnions 136 and 137 extended outward from the casting and sprocket housing and are journalled in left- and right-hand bearings 138 and 139 in the side frames. These bearings locate the axis C. Arms 140 and 141 are fixed to the flanged casting and the sprocket housing, respectively. Rider drum 14 is journalled in bearings 142 in the forward ends of these arms on an axis parallel to the axis C. The right-hand trunnion 137 extending through the bearing 139 is hollow and has a sprocket shaft 143 rotary therein. Shaft 143 is journalled in the trunnion 137 by means of bearings 144.

On its outer end shaft 143 carries a pair of adjustable sheaves 145 by means of which it is driven through belts 146 from the sheave 114 on the main drive shaft 91. On its inner end within the sprocket housing 135, shaft 143 carries a sprocket 147.

The rider drum 14 carries a sprocket 148 adjacent its right-hand end in alignment with sprocket 147. A chain 149 is trained around sprockets 147 and 148 for driving the rider drum. It will be seen that the drive for the rider drum is such that it is driven clockwise as viewed from the right side of the apparatus, and preferably at a peripheral speed slightly greater than the peripheral speed of the back drum 13. The chain 149 rides on an arcuate tensioning shoe 150 adjustably carried on the arm 141 by means of a pin 151 which extends eccentrically from a two-piece cylindrical clamping bracket 152 adjustably rotary in an aperture 153 in arm 141. Bracket 152 is adapted to be clamped in adjusted position in the arm 141 by screws 154. Inasmuch as the arm 141 (as well as the arm 140) is angled as illustrated, an idler guide sprocket 155 is provided for the chain 149 at the angle of the arm 141. The idler sprocket is rotary on a pin 156 which extends eccentrically from a cylindrical bracket 157 adjustably rotary on the arm 141. The pivot for the bracket 157 is a screw 158 extending through an aperture in the arm 141 and threaded centrally into the bracket. The bracket is thus adapted to be locked in adjusted rotary position properly positioning the idler sprocket 155 by tightening the screw against the arm 141.

Outward of the side frames 9 and 10, the trunnions 136 and 137 carry counterweights 159 for the rider drum frame 19. These weights are carried on arms 160 fixed at their ends to the trunnions. The bearing 139 for the trunnion 137 is formed as a bracket having an annular bearing portion 161 fixed in an aperture in the right-hand side frame 10 and a radial bracket arm 162 which extends downward and toward the back of the apparatus. Bracket arm 162 carries a belt tightener mechanism for the belts 146 similar to the belt tightener mechanism for the belts 113. As shown best in Fig. 2, this mechanism comprises an idler roll arm 163 pivoted at one end on a fixed pivot 164 at the outer end of bracket arm 161 and carrying at its other end an idler roll 165 bearing on the belts. The idler roll 165 is biased against the belt by its own weight and the weight of arm 163. The latter arm is braked by means of a friction band 166 fixed at one end to the arm 163, trained around a fixed brake drum 167 secured to the fixed pivot 164, and having a weight 168 on its other end.

The knife roll 17 (cylinder 33 with knives 16 thereon) is driven from the traction drum 12 through a chain and sprocket drive generally designated 170 in Figs. 4, 5 and 7. This drive comprises a sprocket 171 keyed on the left-hand traction roll journal 21. A U-shaped yoke 172 is pivoted on the left-hand reduced-diameter section 41 of the eccentric shaft 39 straddling the left-hand bearing block 46. The yoke is axially confined between the left-hand bearing 45 and a collar 173 on the end of shaft section 41. It moves axially with the shaft 39. The offset journal 43 of shaft section 41 lies between the arms of the yoke. A countershaft 174 is journalled in bearings 175 in the base of the yoke. This countershaft extends out of the base of the yoke at both ends. On its left end is fixed a sprocket 176 generally aligned with sprocket 171. On its right end is fixed a gear 177. A chain 178 is trained around sprockets 171 and 176 for driving the countershaft from the traction roll 12. The gear 177 meshes with a gear 179 formed on the collar 37 for driving the cylinder 33 and knives 16 thereon. The yoke is biased counterclockwise as viewed in Fig. 7 to tension the chain 178 by means of a tension spring 180 connected at 181 to the lower end of the yoke and at 182 to a bolt 183 axially adjustable in the forward vertical wall 184 of the cutter box 49 by means of nut 185 to vary the spring tension. Chain 178 may slide axially on sprocket 171 as sprocket 176 moves axially with the yoke. The knife roll 17 is enclosed by a cover 186 pivoted at 187 at the upper ends of the forward wall 184 of the cutter box.

The traction cutter drum 12 and its bearings 23, the knife roll 17 and the mechanism for driving it from the drum 12, and the elements associated with the knife roll for moving it axially as it is pivoted are all carried by the cutter box 49 and form therewith a removable rotary slitter unit. By unbolting the cutter box from the side frames and disconnecting the traction cutter drum drive at 90, the entire slitter may be readily removed from the apparatus, and replaced by another slitter unit having differently spaced cutters and knives, for example, for slitting the web into strips of a different width.

The paper web W travels upward to the slitter 3 from a lower idler guide roll 188 journalled in the side frames 9 and 10. It travels upward between the traction cutter drum 12 and the knife roll 17, being slit into strips by the shearing action of the cutters 15 and the knives 16. The strips travel around the periphery of the traction drum 12 and are wound up on the arbor 2 into the roll R, which consists of a series of individual rolls of strip in side-by-side contacting relation (Fig. 31). The arbor 2 and the roll R are driven clockwise by the drums 12, 13 and 14, all of which rotate counterclockwise, as viewed from the left side of the apparatus and as viewed in Figs. 11, 12 and 13. The strips lead on to the roll R at its bottom.

As the roll R increases in diameter, it moves the rider drum 14 upward, the rider-drum-carrying arms 140 and 141 swinging counterclockwise, as viewed from the left side of the apparatus and in Figs. 11, 12 and 13, about axis C. The arms 140 and 141 are linked to the arms 107 and 108 carrying the back drum 13 to swing these arms counterclockwise as viewed in Figs. 11–13 about their axis B to move drum 13 back away from the traction cutter drum 12 as the rider drum 14 moves upward. As shown in Figs. 1, 2 and 11–13, arms 140 and 141 are connected to arms 107 and 108, respectively, by releasable adjustable-length links 190, herein illustrated as double-acting reciprocating fluid motors each comprising a pressure cylinder 191 and a piston rod 192 extending from a piston 193 within the cylinder. The cylinders 191 are fixed at one end to a cross-shaft 194 journalled at its ends in extensions 195 and 196 of arms 140 and 141. The piston rods 192 extend from the other ends of the cylinders and are fixed at their outer ends to a cross-shaft 197 journalled at its ends in extensions 198 and 199 of arms 107 and 108.

The cylinders 191 are connected in parallel in a high pressure oil system as illustrated in Figs. 32 and 32A under control of two solenoid valves 200 and 201. Valve 200 has an inlet connected by an oil line 202 to a pressure header 203 supplied with oil under pressure from a suitable source (not shown), an outlet connected by an oil line 204 to a common return leader 205 for returning oil to the source, and a transfer port connected by an oil line 206 to the rearward ends of cylinders 191. Valve 201 has an inlet connected by an oil line 207 to pressure header 203, an outlet connected by an oil line 208 to the return header 205, and a transfer port connected by an oil line 209 to the forward ends of the cylinders 191. Valve 200, when deenergized, connects line 202 through its transfer port to line 206 to supply oil under pressure to the rearward ends of cylinders 191. Valve 201, when deenergized, connects line 209 to line 208 to vent the forward ends of the cylinders 191 to the return header 205. Thus, with both of valves 200 and 201 deenergized, the piston rods 192 are maintained in fully extended position and motors 190 function as substantially rigid links. Under these circumstances, as the rider drum 14 is moved upward by the rolls of strip on the arbor 2 as they increase in diameter, it acts through its frame 19, rigid motor links 190, and the back drum frame 18 to swing the back drum 13 rearward away from the traction cutter drum 12. This provides for proper cradling of the rolls of strip in the drums 12 and 13, and for application of frictional driving forces to the rolls of strip at three axial lines of pressure spaced at wide intervals around the periphery of the rolls of strip. Valve 200, when energized, connects line 206 through its transfer port to line 204 to vent the rearward ends of the cylinders 191 to the return header 205. Valve 201, when energized, connects pressure line 207 through its transfer port to line 209 to supply oil under pressure to the forward ends of the pistons. Thus, with both of valves 200 and 201 energized, the piston rods 192 are retracted into the cylinders 191.

It will be noted that the component of the weight of the roll R applied to the back drum 13 creates a moment tending to swing the back drum away from the traction cutter drum 12. This moment is counterclockwise as viewed in Figs. 11 and 12. It increases as roll R winds up due to the increase in the weight of roll R. It acts through links 190 to tend to swing the rider drum 14 upward away from the roll R and thus to reduce the force applied by the rider drum to the roll R. To compensate for the tendency of the weight of the roll R to bias the rider drum upward away from the roll, there is provided a variable-moment counterbiasing mechanism 211 operative on the back drum frame 18 to cause a somewhat greater counter-moment tending to swing the back drum toward the cutter drum 12 and the rider drum toward the roll R. This counter-moment is clockwise as viewed in Figs. 11 and 12. Mechanism 211 is of such construction that this clockwise counter-moment increases as the roll R winds up to overcome the increasing counterclockwise moment due to the increasing weight of the roll, thereby to maintain the pressure of the rider drum on the roll.

The counterbiasing mechanism 211 comprises a counterweight 212 connected to the back drum frame 18 to bias the latter to swing the back drum 13 toward the traction drum 12. The counterweight is suspended from two chains or cables 213 connected at their upper ends to the back drum frame 18 by means of connections 214 aligned on a transverse axis radially offset from the axis B of the back drum frame. In the initial position of the frame 18 at the start of winding a roll R (Fig. 11), the frame 18 extends substantially vertically upward with the back drum 13 closely adjacent the traction drum 12. This initial position of the frame is determined by stops 18a (Fig. 7) comprising screws adjustably threaded in the rearward wall of the cutter box 49 for engagement by arms 107 and 108 of frame 18. In this position of the frame 18, the axis of chain connections 214 is forward of and below the axis B, and the chains 213 hang straight down from the connections. The weight of counterweight 212, acting through the chains and their connections 214 applies a turning moment to the frame 18 equal to the product of the weight and the moment arm or horizontal distance X from the vertical plane through the axis B to the vertical plane through the chains. This moment is in such direction as to tend to swing the frame 18 toward the traction roll and is relatively small because the moment arm X is small.

As the roll R increases in diameter, the rider drum 14 and its frame 19 move upward, thereby swinging the back drum frame 18 (and the back drum 13) away from the traction drum 12 through the rigid motor links 190. Fixed to the flange of casting 101 and to the sprocket housing 102 of the back drum frame 18 in the longitudinal planes of the chains 213 are cam plates 215 having arcuate forward edges 216. These cam plates are fixed to the back drum frame 18 in such position as to incline downward and toward the rear of the apparatus when the frame 18 is in its initial position of Fig. 11. The chains 213 are connected at their upper ends to the cam plates. As the frame 18 swings away from the traction drum 12, the forward edges 216 of the cam plates engage the chains 213, thereby moving the chains and the counterweight 212 toward the forward end of the apparatus. This increases the effective moment arm of the counterweight, and increases the moment tending to swing the back drum frame 18 toward the traction drum 12, and also tending to swing the rider drum 14 toward the roll R, thereby maintaining the pressure of the rider drum on the roll. Fig. 12 illustrates the positions of the abovementioned elements at the completion of winding a roll R. It will be noted that in this position the cam plates 215 are inclined downward and toward the forward end of the apparatus and have displaced the chains 213 to carry the counterweight 212 toward the forward end of the apparatus so that its effective moment arm has increased to the distance Y, as compared with the initial minimum moment arm X in Fig. 11.

The cam surfaces 216 of the cam plates are so shaped as to cause the necessary gradual increase in the moment arm of the counterweight 212 to cause a gradually increasing counter-moment always somewhat greater than and offsetting the gradually increasing moment due to the weight of the roll R. It has been found preferable to shape the cam plates in such manner that the differential moment acting upon the rider drum frame 19 tending to swing the rider drum toward the roll R does not remain constant but decreases as the roll increases in diameter thereby gradually to decrease the pressure of the rider drum on the roll as it is wound.

The back drum 13 is also biased toward the front drum 12 by a pair of single-acting reciprocating fluid motors 220 each comprising a pressure cylinder 221 and a piston rod 222 extending from a piston 223 within the cylinder. The cylinders 221 are fixed at their rearward ends to a cross-shaft 224 journalled at its ends in bearings 225 in the side frames 9 and 10. The piston rods 222 extend from the forward ends of the cylinders and are pivotally connected to the cam plates 215 of the back drum frame 18 as indicated at 226. The cylinders 221, as shown in Fig. 32A, are connected in parallel in a low pressure oil system including a supply line 227 connected to a suitable source of low pressure oil (not shown) and to the forward ends of the cylinders, and a return line 228 connecting the rearward ends of the cylinders to return header 205. Oil under low pressure is maintained in the forward ends of the cylinders 221 throughout the operation of the apparatus.

At the start of winding of a roll R, the piston rods 222 are retracted, as illustrated in Fig. 11. As the roll R increases in diameter, the back drum frame 18 pulls the piston rods 222 out of the cylinders 221 until they are fully extended at the completion of winding of the roll R, as illustrated in Fig. 12. Subsequently, solenoid valves 200 and 201 are energized to retract piston rods 192, as above described. Piston rods 222 thereupon are also retracted into motor cylinders 221 by the low pressure oil in the forward ends of these cylinders, and the back drum 13 swings forward toward the front drum 12. This lifts the roll R to a position on the front drum (Fig. 13) from which it may be readily rolled out of the winder. The cylinders 221 are so located relative to the cylinders 191 that their respective piston rods are clear of one another. The extensions 198 and 199 of the back drum frame arms 107 and 108, to which the piston rods 192 are connected, are fixed to and extend rearward from cam plates 215.

The pressure of the low pressure oil supply to the cylinders 221 may be made variable for the purpose of enabling the apparatus to wind tight or loose rolls as desired. Increasing the pressure produces a tightly wound roll; reducing the pressure produces a loosely wound roll.

Referring now more particularly to Figs. 1, 2, 16 and 17, the mill roll stand 5 of the web-supply apparatus 4 is shown generally to comprise a roll-holding frame 230 pivoted for swinging movement about a transverse horizontal axis between a lowered mill-roll-receiving position (Fig. 2) and a raised unwinding position (Fig. 1). The frame 230 comprises a transverse shaft 231 journalled in bearing brackets 232 which project from the rearward ends of the side frames 9 and 10 just above the floor. Arms 233 and 234 extend radially from shaft 231 adjacent its ends. These arms are spaced far enough apart to receive between them the largest size mill roll which the apparatus is to accommodate, and are transversely aligned. On the outer ends of arms 233 and 234, respectively, are opposed fluid motor cylinders 235 and 236. These cylinders extend transversely and are coaxial.

In cylinder 235 is a piston 237. A piston rod 238 extends from the piston through the cylinder head 239 at the inner end of the cylinder. The piston rod has a tail extension 240 extending through the cylinder head 241 at the outer end of the cylinder into an extension 242 of the cylinder. The cylinder has ports 243 and 244 adjacent its inner and outer heads, respectively. Port 244 communicates both with the cylinder and with its extension 242 through the head 241. Piston rod extension 240 has a smaller outside diameter than the inside diameter of cylinder extension 242 so that the outer end of the extension 240 is subject to fluid pressure. A tapered chuck spindle 245 is removably fixed in a tapered aperture in the end of piston rod 238. The spindle projects from the piston rod and has a mill roll core chuck 246 journalled on its projecting end. The spindle 245 and chuck 246 are removable as a unit and may be replaced by spindles of different lengths for accommodating mill rolls of widely different widths.

The cylinder 236 has inner and outer cylinder heads 247 and 248 and an intermediate head 249 dividing it into an inner chamber 250 and an outer chamber 251. A piston rod 252 extends slidably through all three cylinder heads. Pistons 253 and 254 are fixed on the piston rod within chambers 250 and 251, respectively. The cylinder has ports 255 and 256 at the inner and outer ends of chamber 250 and ports 257 and 258 at the inner and outer ends of chamber 251. The outer end of the piston rod is movable through the outer cylinder head 248 into an extension 259 of the cylinder 236. Head 248 is ported as indicated at 260 so that cylinder port 258 is in communication with cylinder extension 259. The portion of the piston rod movable into the cylinder extension 259 is of smaller diameter than the inside diameter of the cylinder extension so that the outer end of the piston rod is subject to fluid pressure. A mill roll core chuck 261 is journalled on the inner end of the piston rod, aligned with and opposed to chuck 246.

The cylinders 235 and 236 are connected in the high pressure oil system as illustrated in Figs. 32 and 32A under control of a series of solenoid valves 262, 263, 264, 265 and 266. As shown, valve 262 has an inlet connected by a pressure line 267 to the pressure header 203, an outlet connected by return lines 268 and 269 to the return header 205, and a transfer port connected by a line 270 to the outer end of cylinder 235. Valve 263 has an inlet connected by the pressure line 267 to the pressure header 203, an outlet connected to return line 268, and a transfer port connected by a line 271 to the inner end of cylinder 235. Valve 264 is a stop valve controlling flow of oil through valves 265 and 266. It has a transfer port connected by a line 272 to the return line 269 and two other ports connected by lines 273 and 274 to the outlets of valves 265 and 266, respectively. Valve 265 has an inlet connected by a pressure line 275 to the pressure header 203 and a transfer port connected by a line 276 having branch connections 277 and 278 to ports 255 and 257 of the cylinder 236. Valve 266 has an inlet connected to the pressure line 275 and a transfer port connected by a line 279 to the port 258 of cylinder 236. A line 280 connects line 270 with the port 256 of cylinder 236 to provide communication between the outer end of cylinder 235 and the outer end of inner chamber 250 of cylinder 236.

Valve 262, when deenergized, connects pressure line 267 through the valve transfer port to line 270 and, when energized, connects line 270 through the transfer port to return line 268. Valve 263, when deenergized, connects line 271 through the valve transfer port to return line 268 and, when energized, connects pressure line 267 through the transfer port to line 271. Thus, when valves 262 and 263 are deenergized, pressure is supplied through the line 270 to the outer end of cylinder 235 and vented from its inner end through line 271. When valves 262 and 263 are energized, pressure is supplied through the line 271 to the inner end of cylinder 235 and vented from its outer end through line 270. It will be noted that when valves 262 and 263 are deenergized, pressure is supplied through line 280 to the inner end of chamber 250 of cylinder 236, and, when valves 262 and 263 are deenergized, the inner end of chamber 250 is vented through lines 280 and 270. Valve 264, when deenergized, connects line 273 through the valve transfer port to return line 272 and blocks line 274. When energized, it connects line 274 through the transfer port to return line 272 and blocks line 273. Valve 265, when deenergized, connects line 276 through the valve transfer port to line 273 and, when energized, connects pressure line 275 through the transfer port to line 276. Valve 266, when deenergized, connects line 279 through the valve transfer port to line 274 and, when energized, connects pressure line 275 through the transfer port to line 279.

When valves 262 and 263 are energized, oil under pressure is supplied through line 271 to the inner end of cylinder 235 and vented from the outer end of the cylinder through line 279 to retract the piston rod 238 and the chuck 246. This spreads the chucks 246 and 261 to permit a mill roll to be positioned therebetween, with its axis coincident with the axis of the chucks. Upon subsequent deenergization of valves 262 and 263, oil under pressure is supplied through line 270 to the outer end of cylinder 236 and vented from the inner end of the cylinder through line 271. This moves piston rod 238 inward to cause chuck 246 to enter one end of the mill roll core. At the same time, oil under pressure is supplied from line 270 through line 280 to the outer end of the inner chamber 250 of cylinder 236. Since the inner ends of both chambers 250 and 251 are vented through lines 277 and 278, line 276, valve 265, line 273 and valve 264 to return line 272, piston rod 252 is moved inward to cause chuck 261 to enter the other end of the mill roll core. As soon as the chucks come into engagement with the ends of the mill roll, the forces of piston rods 238 and 252 are opposed to one another. The force tending to move the piston rod 238 inward, however, is greater than the force tending to move the piston rod 252 inward, since the piston area exposed to pressure in cylinder 235 (the full circular area of piston 237, considering the outer end of piston rod extension 240 as part of the piston) is greater than the piston area exposed to pressure in the outer end of chamber 250 of cylinder 236. There is no pressure in the chamber 251 at this time. Consequently, both piston rods and the mill roll move toward cylinder 236 until oil blocked in the system in the outer end of chamber 251, line 279, valve 266, and line 274 between piston 254 and valve 264 is compressed. This stops the mill roll in a predetermined transverse position.

Should any transverse adjustment of the mill roll from the above-mentioned predetermined position be required, such adjustment is effected by means of valves 264, 265 and 266. If the mill roll has to be shifted further toward cylinder 236, valves 264 and 265 are energized. This supplies oil under pressure through line 276 and branch lines 277 and 278 to the inner ends of chambers 250 and 251. It unblocks line 274, connecting this line through valve 264 to the return line 272. The pressure in the inner ends of chambers 250 and 251 and in the outer end of cylinder 235 applies greater force than the pressure in the outer end of chamber 250 (supplied through lines 270 and 280) and consequently both piston rods 238 and 252 move toward the cylinder 236 to shift the mill roll in that direction. Oil is vented from the outer end of chamber 251 through line 279, valve 266, line 274 (now unblocked), valve 264 and return line 272. Such movement continues until valve 264 is deenergized again to block line 274 and prevent venting from the outer end of chamber 251. If the mill roll has to be shifted further toward cylinder 235, valve 266 is energized. This supplies oil under pressure from line 275 through valve 266 and line 279 to the outer end of chamber 251. Pressure in the outer end of the chamber 251 supplied through line 279 and in the outer end of chamber 250 supplied through line 280 applies greater force than the pressure in the outer end of cylinder 235 and consequently both piston rods 238 and 252 move toward cylinder 235 to shift the mill roll in that direction. Oil is vented from the inner ends of chambers 250 and 251 through branch lines 277 and 278, line 276, valve 265, line 273 (now unblocked with valve 264 deenergized) and valve 264 to return line 272. This movement continues until valve 266 is deenergized, whereupon oil is trapped in the outer end of chamber 251, line 279, valve 266 and line 274 to prevent reverse movement of the mill roll.

Two fluid motors, each comprising a pressure cylinder 281, are provided for lifting the roll-holding frame 236 from its lowered mill-roll-loading position of Fig. 2 to its raised unwinding position of Fig. 1. The lift cylinders 281 are fixed at their forward ends to a transverse shaft 282 journalled at its ends in bearings 283 in the side frames 9 and 10. Piston rods 284 extend out of the rearward ends of the cylinders from pistons within the cylinders and are pivotally connected to arms 233 and 234 as indicated at 287. The cylinders 281 are connected in parallel in the high pressure oil system as illustrated in Fig. 32A under control of three solenoid valves 288, 289 and 290. Valve 288 has a pressure inlet connected to the pressure line 282, a port connected by a line 291 including a reducing valve 292 to a line 293 leading to the forward ends of the cylinders 281, and a port connected by a line 294 to the rearward ends of the cylinders 281. Valve 289 has a pressure inlet connected to the pressure line 282, a port connected to the line 291 ahead of the reducing valve 292 and a port connected by a line 295 to the line 293. Valve 290 has an inlet connected to the line 291 ahead of the reducing valve and beyond the valves 288 and 289. It has an outlet port connected by a line 296 to the return header 205. Valve 288, when deenergized, connects pressure line 282 to line 294 to supply oil under pressure to the rearward ends of the cylinders 281. When energized, it connects line 294 to the line 291. Valve 289, when deenergized, connects line 295 to the line 291. When energized, it connects pressure line 282 to the line 295. Valve 290, when deenergized, is open for flow from line 291 to return line 296 and, when energized, blocks line 296 from line 291.

With all three valves 288, 289 and 290 deenergized, the mill roll holding frame 236 is maintained in its raised position of Fig. 1. Under these circumstances, oil under pressure is supplied from line 282 through valve 288 and line 294 to the rearward ends of the cylinders 281 and oil is vented from the forward ends of the cylinders through line 293, line 295, valve 289, line 291, valve 290 and line 296 to return header 205. Pressure in the rearward ends of the cylinders maintains the piston rods 284 retracted to hold the roll-holding frame 230 in raised position. To lower the frame 230, valves 288 and 289 are energized. This supplies oil under pressure from line 202 through valve 289, line 295 and line 293 to the forward ends of the cylinders 281. It vents oil from the rearward ends of the cylinders through line 294, valve 288, line 291 and line 296 to the return header 205. This moves piston rods 284 outward to lower the roll-holding frame 230. To stop the frame in position with chucks centered in respect to a mill roll positioned in the frame, valve 290 is energized to block return flow through line 296. This provides for quickly stopping the frame without drifting. If the frame as it is lowered should strike an obstruction, pressure built up in line 293 is by-passed through the reducing valve 292 in line 291 back to line 296 and the return header 205.

To position a mill roll M for unwinding, the roll-carrying frame 230 is lowered to its loading position of Fig. 2, and the chucks 246 and 261 are separated as above described. The mill roll is rolled on the floor into a position between the arms 233 and 234 of the frame 230 with its axis coincidental with the axis of the chucks. The latter are then moved toward one another until they enter the ends of the mill roll core. The frame 230 is then raised by means of the lifting cylinders 281 to raise the mill roll off the floor to unwinding position. While the mill roll is being lifted, it may be axially adjusted for centering purposes by moving both chucks in one transverse direction or the other as above described. As the mill roll moves into its raised unwinding position it engages with and tightens a plurality of web tensioning belts 300.

As herein illustrated, three endless web tensioning belts 300 are provided, although the number of belts may be varied. The belts are spaced apart transversely of the apparatus. For each belt there is provided a system of guides comprising four pulleys 301, 302, 303 and 304, rotary on fixed axes, and a movable belt tightener pulley 305. Pulleys 301 and 302 are located at the rear of the apparatus, being vertically spaced far enough apart to receive a full-sized mill roll M between them, with the mill roll in its raised unwinding position engaging the reaches of the belts spanning pulleys 301 and 302 in such manner that these reaches of the belts are stretched in an arc of substantial length around the periphery of the mill roll. Pulleys 301 are journalled in bearing brackets 306 extending forward from roll-holding frame shaft 231 generally at right angles to the arms 233 and 234. Pulleys 302 are journalled in bearing brackets 307 extending forward from a cross-bar 308 which spans the upper edges of the side frames 9 and 10 adjacent their rearward ends.

Pulley 303 is a single pulley guiding all three belts 300. This pulley is an element of a speed regulating mechanism for the belts for correlating the peripheral speed of the mill roll M with the peripheral speed of the roll R being wound. Pulley 303 comprises a roll having trunnions 309 (Fig. 22) by means of which it is journalled for rotation in bearings 310 fixed on the upper edges of the side frames 9 and 10 on a transverse axis forward of the transverse axis of pulleys 302. The pulley roll 303 has three transversely spaced peripheral grooves 311 for guiding the belts 300. A pair of sheaves 312 are fixed on the right-hand trunnion 309 outward of the right-hand side frame 10. Belt drives 313 and 314 (Fig. 2) connect sheaves 312 to the sheave 114 on the main drive shaft 91. As the mill roll M rotates in unwinding, it drives the belts 300 and the latter drive the pulley 303 and sheaves 312. The speed of the belts is limited, however, by the belt drives 313 and 314 connecting the pulley 303 and the main drive shaft 91. Drives 313 and 314 are such as to limit the speed of the belts to a value slightly less than the peripheral speed of the roll R being wound. This tensions the web W.

Pulleys 304 are located below and forward of the pulley 303 so that the reaches of the belts spanning pulleys 303 and 304 are inclined downward from pulley 303 toward the forward end of the apparatus. Each of pulleys 304 is carried by an inclined frame generally designated 315. There are three such frames, one for each belt, supported on upper and lower transverse rods 316 and 317 spanning the side frames 9 and 10, and best illustrated in Figs. 18–20. The upper rod is fixed at its ends in brackets 318 mounted on the upper edges of the side frames 9 and 10 between the pulleys 302 and 303. The lower rod 317 is fixed at its ends in brackets 319 formed as parts of the side frames 9 and 10 and located below and forward of the upper rod 316. Each frame 315 comprises an upper collar 320 fixed on the upper rod 316 and a lower collar 321 fixed on the lower rod 317. These collars mount two parallel guide rods 322, which incline forward and downward from the upper collar and extend through and beyond the lower collar. The guide rods are located on opposite sides of the rods 316 and 317, being diagonally disposed with respect to the collars 320 and 321, which have diagonally opposite aperture ears 323 and 324, respectively, receiving the guide rods. Each pulley 304 is journalled in bearings 325 on sleeves 326 which surround the lower ends of the guide rods extending beyond the lower collar 321. The sleeves are retained on the guide rods between the collar 321 and a strap 327 bolted to the ends of the guide rods.

Each of the belt-tightening pulleys 305 is journalled in a pulley block 328 (Fig. 18) slidable on the guide rods 322 of a respective frame 315. Each pulley block comprises a pair of sleeves 329 slidable on the guide rods and having bearings 330 journalling the pulley 305. The sleeves 329 are connected together by upper and lower crossheads 331 and 332. An air cylinder 333 is fixed between the guide rods 322 at the upper end of each of the inclined frames 315 by means of bolts 334 extending from the upper collar 320. A piston rod 335 extends from a piston 336 in each cylinder through the lower end of the cylinder and is fixed at its lower end to the respective upper crosshead 331 for moving the respective pulley block 328. Ports 337 and 338 are provided in the upper and lower ends of each of the cylinders 333. The pulleys 305 guide the belts 300 in a loop between the pulleys 302 and 303. By supplying air under pressure to the upper ends of cylinders 333 through ports 337 and exhausting the lower ends of the cylinders through ports 338, the pulleys 305 are biased downward to take up any slack in the belts thereby to maintain them in tight frictional engagment with the periphery of the mill roll. The pistons 336 and the pulleys 305 have a sufficient stroke to take up slack in the belts as the mill roll is unwound from its maximum to its minimum diameter.

The unwinding web W leads off the top of the mill roll M, which rotates clockwise as viewed from the left side of the apparatus (Fig. 1). It travels first around an idler guide roll 340 journalled in bearings 341 mounted on the upper edges of the side frames 9 and 10 at their rearward ends. From the roll 340 the web travels forward through the cutting and clamping mechanism 6, thence around a spring-biased whip roll 342 and back to an idler guide roll 343. The web travels from the latter roll to the lower idler guide roll 186, from which it travels upward to the slitter 3. The whip roll 342 is spring biased toward the forward end of the apparatus to pull a loop in the web between the guide rolls 340 and 343. It is also adapted to be moved transversely of the apparatus to position it with its center line coinciding with the center line of the web W so as to maintain alignment of the web.

The whip roll 342 is mounted for movement transversely and longitudinally of the apparatus in the manner best shown in Figs. 22–25. It is journalled at its ends in bearings 344 which are slidable longitudinally of the apparatus in guide frames 345 which in turn are slidable transversely of the apparatus on longitudinally spaced transverse guide rods 346 and 347. These rods are fixed at their ends in brackets 348 mounted on the upper edges of the side frames 9 and 10. They are spaced from one another in a horizontal plane and located forward of the pulley 303. Each guide frame 345 comprises a forward slide block 349 slidable on the forward guide rod 346 and a rearward guide block 350 slidable on the rearward guide rod 347. Blocks 349 and 350 are connected by upper and lower spacer bolts 351 which maintain them in longitudinal alignment as they slide transversely on the guide rods. Bolts 351 serve as longitudinal guide rods for the whip roll bearings 344, which are longitudinally slidable thereon. The left and right-hand guide frames 345 are tied together by the whip roll. The idler guide roll 343 is journalled at its ends in bearings 352 carried by the rearward slide blocks 350.

The whip roll is biased longitudinally of the apparatus toward the forward end thereof by four tension springs 353 connected between lugs 354 fixed to the tops and bottoms of the forward slide blocks 349 and lugs 355 fixed to the tops and bottoms of the whip roll bearings 344. These springs pull the whip roll forward to maintain taut the web in the loop travelling around the whip roll. Bumper springs 356 surround the bolts 351 adjacent the forward slide blocks 349 to cushion the impact of the whip roll bearings 344 on these blocks in the event of breakage of the web.

The position of the whip roll 342 longitudinally of the apparatus varies with variations in the tension of the web. Movement of the whip roll in response to variations in tension is utilized to operate a web tension indicator 360. As shown best in Figs. 22–25, this indicator comprises a coarse-thread screw 361 journalled for rotation on a longitudinal axis and fixed against axial movement in a bearing bracket 362 mounted on top of the left-hand forward slide block 349. The bracket has a forwardly-facing dial 363 on its forward end. The screw extends through the forward end of the bracket and carries a pointer 364 on its forward end cooperable with the dial. The screw extends rearward from the bracket 362 through a nut 365 which is non-rotary on the left-hand whip roll bearing 344. The arrangement is such that as the whip roll moves longitudinally of the apparatus in response to variations in tension of the web, the nut 365 travels axially on the screw 361 and rotates the screw to rotate the pointer 364. The pointer and the dial 363 are visible from the forward end of the apparatus so that the operator may readily note any variations in web tension above or below a predetermined standard and make adjustments accordingly (see Fig. 3).

The whip roll 342 is adapted to be shifted transversely of the apparatus to center it with respect to the web and thus to avoid any tendency toward canting of its bearings 344 by means of a double-acting fluid motor comprising a cylinder 366 mounted on the upper edge of the right-hand side frame 10 and extending transversely of the apparatus. A piston rod 367 extends through the inner end of the cylinder from a piston 368 in the cylinder and is connected at its end to the left-hand guide frame 345 as indicated at 369. The cylinder has ports 370 and 371 in its inner and outer ends. By supplying fluid under pressure through port 370 and opening port 371 to exhaust, the piston 368 and the whip roll may be shifted to the right, as shown in dotted lines in Fig. 23. By supplying fluid under pressure through port 371 and opening port 370 to exhaust, the piston and the whip roll may be shifted to the left.

The stroke of piston 368 and the corresponding distance through which the whip roll may be shifted transversely of the apparatus are sufficient to accommodate all the various standard widths of web which the apparatus is designed to accommodate. In loading a mill roll into the apparatus, the mill roll core chucks 246 and 261 are shifted to align the end of the mill roll at the left-hand side of the apparatus (the right-hand end of the mill roll as viewed in Fig. 17) with an index mark E on the idler guide roll 340 (see Fig. 17) no matter what the width of the web may be. The whip roll is then shifted transversely until it is centered with respect to the web. To facilitate this centering operation, a pointer 372 (Fig. 3) may be provided on the forward right-hand slide block 349 travelling in front of a centering scale 373 bearing indicia denoting the various standard widths of web. The whip roll is shifted until the pointer coincides with the index mark on scale 373 denoting the particular standard width of web loaded in the apparatus. This centers the whip roll with respect to that width of web.

For slitting and winding webs W of different widths, it is necessary to change the weight of the counterweight 212 in proportion to the width of the web. This is because a roll R wound from a wide web is proportionately heavier than a roll wound from a narrow web, imposes a greater moment tending to swing the back drum 13 away from the front drum 12, and requires a greater counter-moment to be applied by the counterweight 212. The counterweight 212 is accordingly designed to apply the proper counter-moment for winding the narrowest web which is to be slit and wound, and provision is made for automatically adding extra weights to the counterweight for winding wider webs. As best shown in Figs. 3, 11–13, 26 and 27, the counterweight 212 comprises a horizontal bar 375 suspended at its ends by the chains 213. A key plate 376 is fixed to the bar 375 adjacent its right-hand end. This plate has a beveled horizontal upper keying edge 377 extending transversely of the apparatus above the upper edge of the bar 375. The latter carries a weight 378 between the key plate 376 and its left-hand end. This weight is permanently fixed to the bar and is of such mass as to apply the proper counter-moment for winding the narrowest web which the apparatus is to accommodate, for example a web twenty-eight inches wide.

For winding wider webs, one or more of a set of extra weight 379 are additive to the counterweight bar 375. Each of weights 379 is proportioned, for example, to accommodate an extra two inches of web width. Thus, one of weights 379 is added for winding thirty inch web, two for winding thirty-two inch web, etc. With six weights 379 as herein illustrated, the apparatus will accommodate seven different widths of web ranging from twenty-eight inch web to forty inch web. For the latter width, all six weights 379 are added to the bar 375. Each of the weights 379 is carried by a weight-loading mechanism 380 in position to be loaded on the bar 375 when the latter is in its lowest and most rearward position corresponding to the initial position of the back drum frame 18 at the start of winding (Fig. 11). There are six such weight-loading mechanisms, one for each weight, and all identical.

Each weight-loading mechanism comprises a loading arm 381 pivoted at its rearward end for rocking movement in a vertical longitudinal plane about an axis located rearward of and above the initial position of the counterweight bar 375. As shown in Figs. 11–13, 26 and 27, the loading arm 381 is pivoted by means of the hinge pin 382 of a hinge carried by an angle iron 382A which extends transversely between the side frames 9 and 10. The arm 381 extends forward from its pivot 382 and is centrally supported in generally horizontal position by a vertical single-acting fluid cylinder 383 by means of which the arm may be held in a raised position or lowered. The cylinder 383 is slidable on a piston 384 having a port 385 and fixed to the horizontal leg of an angle iron 386 which extends transversely between the side frames 9 and 10. At its upper end, cylinder 383 is closed by an upper end head 387 which is loosely pinned to the arm 381 at 388. A tubular screw 389 threaded into the upper end of piston port 385 holds down packing 390 compressed between the upper end of the piston and a collar 391 backed up by a nut 392 threaded on the screw. A rod 393 is pivoted at 394 to the arm 381 and extends downward through an aperture in the horizontal leg of angle iron 386. On the lower end of the rod 393 below the horizontal leg of the angle iron is a stop collar 395 engageable with said leg for limiting the upward movement of arm 381.

Figure 26:
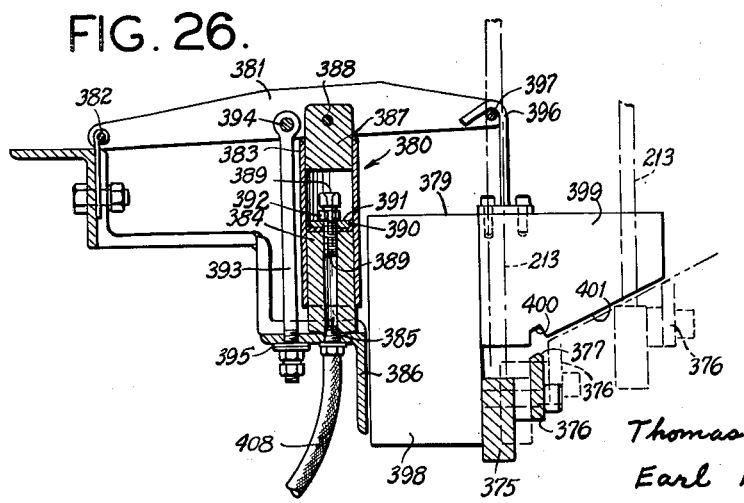
Fig. 26 is an enlarged vertical section taken on line 26—26 of Fig. 3.

The above-described arrangement is such that by introducing fluid under pressure through ports 385, the cylinders 383 may be maintained in a raised position to hold the arms 381 in the raised position shown in Fig. 26. By exhausting fluid from the cylinders through ports 385, the cylinders may be lowered to lower arms 381 to the lowered position shown in Fig. 27. Each arm 381 is of such length that its forward end is located above the counterweight bar 375 when the latter is in its initial position. Each weight 379 has a hook 396 by means of which it is suspended from a pin 397 at the forward end of its respective arm 381. The hooks angle rearward over the pins so that the hooks may disengage from the pins upon forward movement of the weights. Each weight 379 has a vertical leg 398 rearward of the bar 375 and a horizontal leg 399 extending forward from the upper part of the vertical leg over the key plate 376. In the bottom edges of the horizontal legs 399 are notches 400 for receiving the upper edge 377 of the plate 376. These bottom edges incline upward forward of notches 400, as indicated at 401.

The hooks 396 are of such length that when arms 381 are in their raised position, the weights 379 are raised out of keying engagement with the key plate 376 (Fig. 26). Under these circumstances, as the counterweight bar 375 swings forward as the roll R is wound, the key plate 376 swings forward and upward under the inclined bottom edges 401 of the weights as illustrated in dotted lines in Fig. 26. The weights remain suspended from the pins 397 at the forward ends of arms 381. When any one of arms 381 is lowered, however, the weight 379 suspended from that arm is lowered onto the key plate, which engages in the notch 400 of that weight (Fig. 27). Now as the counterweight bar 375 swings forward and upward, the key plate raises the weight 379, lifting its hook 396 from the pin 397, and carries the weight along with the bar 375, as illustrated in dotted lines in Fig. 27.

When a twenty-eight inch web is being wound, fluid under pressure is maintained in all the cylinders 383 to maintain all the weights 379 in raised position so that they are not added to the load on the counterweight bar 375. When a thirty inch web is wound, one of the cylinders 383 is vented to exhaust to lower its respective weight upon the bar 375 to add one unit of weight thereto. For the wider webs, additional units of weight are similarly added. The supply and exhaust of fluid from the cylinders 383 may be manually controlled, but it is preferred to provide for automatic control of the weights 379 in response to centering adjustment of the whip roll 342. For this purpose, a weight control valve 402 (Figs. 22 and 23) is mounted on the upper edge of the left-hand side frame 9 in position for operation by the whip roll as it is adjusted transversely of the apparatus. The valve 402 is a reciprocating valve comprising a valve cylinder 403 having a piston valve 404 slidable therein. The valve cylinder is mounted with its axis extending transversely of the apparatus. A valve stem 405 extends from the piston valve through the inner end head of the cylinder and is coupled at 406 to the left-hand valve guide frame 345 of the whip roll. In the wall of the valve cylinder 403 is an axial series of ports 407, each one of the ports corresponding to one of the cylinders 383 and connected to the ports 385 of the cylinders by lines 408. These valve ports 407 are axially spaced at distances corresponding to standard web width increments. The valve stem 405 is of smaller diameter than the bore of the valve cylinder to provide an annular fluid chamber around the stem. At the inner end of the valve cylinder is a fluid inlet port 409. At the outer end of the valve cylinder is an exhaust port 410. When the whip roll is in its extreme left-hand position centered in respect to the narrowest web (twenty-eight inch web), the piston valve 404 is in its outermost position wherein all six valve ports 407 are open to the inlet 409 for supplying fluid under pressure to all six cylinders 383 and wherein all six valve ports 407 are cut off from the exhaust port 410 (Fig. 23). This maintains all six weights 379 raised. When the whip roll is shifted one inch to the right to center it for a thirty inch web, piston valve 404 is moved to the right to open the outermost one of ports 407 to exhaust, while the other five ports remain in communication with the inlet 409. This holds five of weights 379 raised, but lowers the sixth weight on to the counterweight bar 375. When the whip roll is shifted to its extreme right-hand position for centering it in respect to a forty inch web, the piston valve 404 blocks off all the ports 407 from the inlet 409 and opens them all to exhaust 410. This lowers all six extra weights 379 on to the counterweight bar 375. The operation for other widths of web not specifically mentioned will be readily understood.

Figure 17:
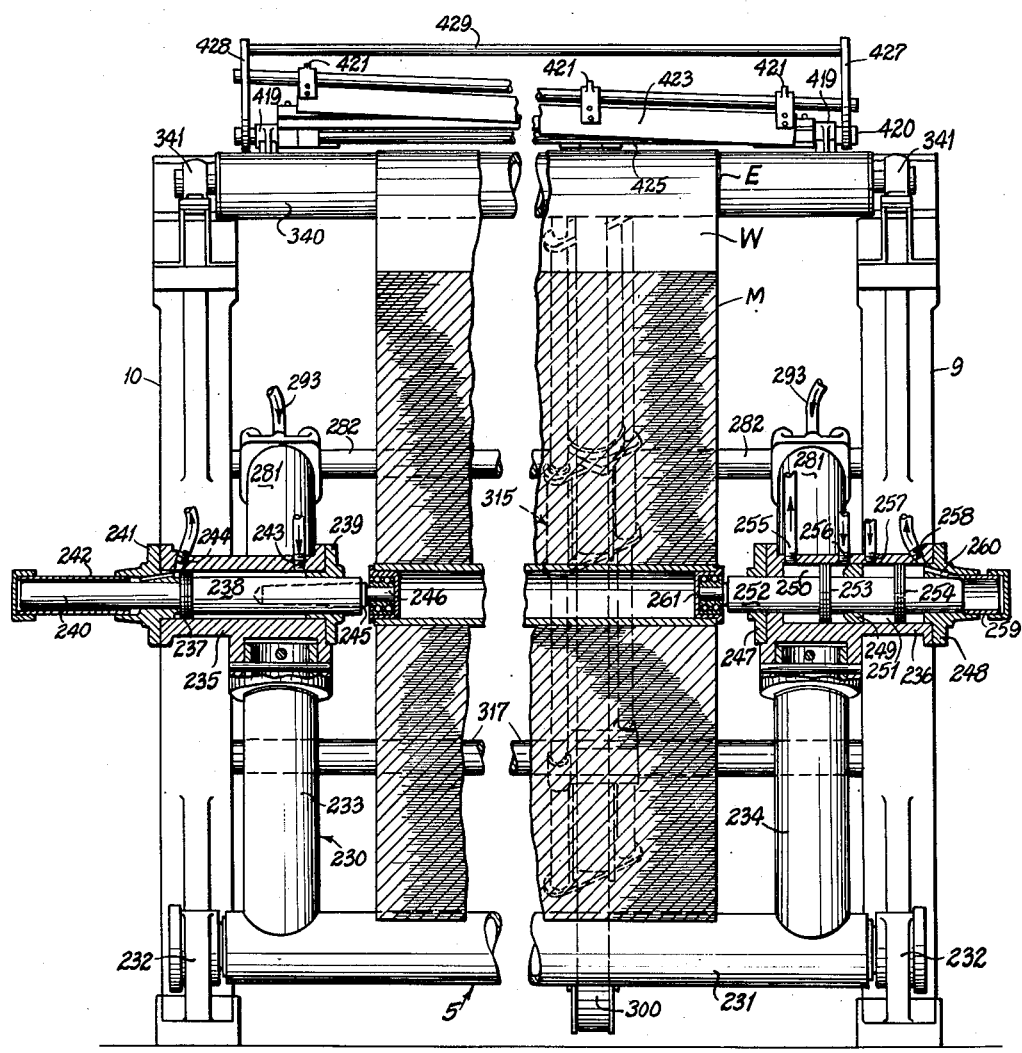
Fig. 17 is an enlarged rearward end elevation with parts broken away and shown in section.

The web cutting and clamping apparatus 6 comprises a table 415 over which the web travels between the idler guide roll 340 and the whip roll 342. This table is mounted at its rearward end on cross-bar 398 and extends forward to a cross-bar 416 spanning the upper edges of the side frames 9 and 10 between the belt pulley 303 and the rearward whip roll guide rod. The table extends above belt pulleys 302 and 303 and the transverse rod 316. It is narrower than the distance between the inside faces of the side frames and has its longitudinal edges spaced from the side frames as shown in Fig. 22 to provide spaces for clamp-operating pressure cylinders 417 and 418. At the ends of cross-bar 308 are brackets 419 in which is journalled a transverse shaft 420. Pivoted on the shaft 420 at spaced intervals along its length are rocker arms 421 which extend rearward. The rocker arms are arranged at progressively increasing angles to the horizontal from one end of the shaft 420 to the other and are tied together in such relation by means of a tie rod 422 extending through their rearward ends. A knife blade 423 is fixed to downward extensions 424 of the rocker arms 421 so as to extend transversely of the apparatus with its cutting edge 425 inclined (Fig. 17). The knife blade is cooperable shearwise with a fixed cutting blade 426 at the rearward end of the table 415 (Fig. 28). Fixed on the left and right-hand ends of the shaft 420 are levers 427 and 428. These levers extend rearward and upward from the shaft. They are tied together intermediate their ends by the tie rod 422 and at their upper ends by a transverse handle bar 429. A tension spring 430 (Fig. 28) is connected between a forward extension 431 of the right-hand lever 428 and the cross-bar 308 at 432. This spring biases the knife blade 423 to the retracted position illustrated in solid lines in Fig. 28 wherein its cutting edge 425 is spaced above the fixed cutting blade 426 for passage of the web W. The knife may be pulled down by means of handle bar 429 to shear the web at the edge of the blade 426.

A rearward web clamp 433 is carried for pivotal movement toward and away from the table 415 by means of a plurality of rocker arms 434 pivoted on the transverse shaft 420. These arms extend rearward from the shaft and carry the clamp 433 at their rearward ends. The clamp has a rubber pad 435 for resiliently clamping the web against the table. It is operated by the pressure cylinders 417. There are two such cylinders, one at each end of the transverse shaft 420, mounted in vertical position on a horizontal plate 436 extending forward from the cross-bar 308. A piston 437 is slidable in each cylinder and has a piston rod 438 extending through the upper head of the cylinder articulated at 439 to a forward extension 440 of the rocker arm 434 at the end of the shaft 420. The cylinders 417 have ports 441 and 442 in their upper and lower heads, respectively. By supplying pressure fluid through the upper ports 441 and opening lower ports 442 to exhaust, the web clamp 433 may be maintained in the raised retracted position illustrated in Fig. 28. By supplying pressure fluid through the lower ports 442 and opening upper ports 441 to exhaust, the web clamp may be moved downward to clamp the web W against the table 415.

A forward web clamp 443 is carried for pivotal movement toward and away from the table 415 by means of a plurality of rocker arms 444 pivoted on the transverse shaft 420. These arms are shorter than the rearward clamp rocker arms 434, extend rearward from shaft 420, and carry the clamp 443 at their rearward ends in position to clamp the web W against the table just forward of the rearward clamp 433. The clamp has a rubber pad 445 for resiliently clamping the web against the table. It is operated by the pressure cylinders 418. There are two such cylinders, one at each end of the transverse shaft 420, mounted in vertical position on the horizontal plate 436 extending forward from the cross-bar 308. A piston 447 is slidable in each cylinder and has a piston rod 448 extending through the upper head of the cylinder articulated at 449 to a forward extension 450 of the rocker arm 444 at the end of the shaft 420. The cylinders 418 have ports 451 and 452 in their upper and lower heads, respectively. By supplying pressure fluid through the upper ports 451 and opening lower ports 452 to exhaust, the web clamp 443 may be maintained in a raised retracted position. By supplying pressure fluid through the lower ports 452 and opening upper ports 451 to exhaust, the web clamp 443 may be moved downward to clamp the web W against the table 415, as illustrated in Figs. 28 and 29.

As best shown in Figs. 2 and 30, the retractable bridge 8 comprises a platform 460 carried by a frame 461 mounted for sliding movement between the retracted position under the table 7 illustrated in Figs. 1 and 2 and the extended position illustrated in Fig. 13. The frame 461 consists of angle iron side frame members 462 and transverse frame members 463. The side angle irons 462 are slidable on angle iron guides 464 located under the table 7 and inclined upward toward the rearward edge of the table. The guides 464 are supported at their forward ends by struts 465 extending downward from the table and braced by a transverse angle iron 466, and at their rearward ends by angle clips 467. The guides are located to guide the frame 461 for sliding movement in a plane which inclines upward toward the rear of the apparatus and intersects the vertical forward wall of the cutter box cover 186. The platform 460 is pivoted on the frame 461 by means of a pair of rearward links 468 and a pair of forward links 469. The rearward links 468 are pivotally connected at their upper ends to the sides of the platform, as indicated at 470, and at their lower ends have a lost-motion pin and slot connection 471 with the frame 461. The forward links 469 are pivotally connected at their upper and lower ends to the sides of the platform 460 and the frame 461, as indicated at 472 and 473.

An air motor comprising pressure cylinder 474 is provided under the table 7 for moving the frame 461. The cylinder 474 is fixed at its forward end to the transverse angle iron 466. A piston 475 is slidable in the cylinder and has a piston rod 476 extending out through the rearward end of the cylinder and connected at 477 to the frame 461. The cylinder has ports 478 and 479 in its rearward and forward ends, respectively. Piston 475 is normally retracted with the frame 461 in its retracted position under the table illustrated in Fig. 1. By supplying air under pressure to the forward end of the cylinder through port 479 and opening port 478 to exhaust, the piston is moved rearward to move the frame 461 and platform 460 toward the winder 1. During this movement, the platform 460 occupies a position of rest on the frame 461 projecting rearward therefrom and remains in this position until the rearward edge of the platform strikes the vertical forward wall of the cutter box cover 186. Upon continued rearward movement of the frame 461, the platform 460, now restrained from further rearward movement, is raised upward as links 468 and 469 pivot clockwise as viewed in Fig. 13 until it bridges the space between the cutter box cover 186 and the rearward edge of the table 7 with its rearward edge level with the horizontal top wall of cover 186 and its forward edge level with the top of the table. The table is lower than the top wall of cover 186 so that the platform 460 inclines downward from the cover 186 to the table. Rearward movement of the frame 461 is discontinued when the rearward edge of the frame strikes the cutter box cover 186. To retract the platform 460, air under pressure is supplied to the rearward end of the cylinder through port 478 and the forward end of the cylinder is vented through port 479. This slides frame 461 forward, permitting the platform to lower to its position of rest on the frame and to return to retracted position under the table.

The belt tensioning cylinders 333, the web clamp cylinders 417 and 418, and the bridge cylinder 474 are connected in an air pressure system as illustrated in Figs. 32 and 32A under control of solenoid valves 480, 481, 482 and 483. Valve 480 has an inlet connected by a pressure line 484 to the outlet of a reducing valve 485. The inlet of the latter is connected by a pressure line 486 to a suitable source of air under pressure (not shown). Valve 480 has an outlet connected to an exhaust header 487 and a transfer port connected by a line 488 to a port 489 at one end of a surge tank 490 (see Fig. 21). The latter comprises an elongate hollow cylindrical tank fixed in transverse position between the side frames 9 and 10 forward of the cylinders 333 (Fig. 18). Three air lines 491 connect the tank to the respective ports 337 in the upper ends of the three belt tensioning cylinders 333. Within the surge tank 490 is a smaller surge tank 492, also comprising an elongate hollow cylindrical tank, but shorter and of smaller diameter than tank 490. Three air lines 493 connect the respective ports 338 in the lower ends of the three belt tensioning cylinders 333 to the inner surge tank 492. The latter has a port 494 at one end thereof to which is connected a line 495 leading to the transfer port of valve 481.

A line 496 is taken off the line 488 and has branch connections 497 and 498 to the upper ends of web clamp cylinders 417 and 418. The two rear clamp cylinders 417 are connected in parallel with branch 497 and the two forward clamp cylinders 418 are connected in parallel with branch 498. Valve 481 has a pressure inlet connected by a line 499 to a high pressure line 500 taken off the supply line 486 ahead of the reducing valve 485. The pressure line 500 leads to the port 478 in the rearward end of the bridge cylinder 474. Valve 481 has an outlet connected to the exhaust header 487. The lower ends of the two forward web clamp cylinders 418 are connected by a line 501 to the line 495 which connects to the transfer port of valve 481. The valve 482 has a pressure inlet connected by a line 502 to the high pressure line 500. It has an outlet connected to the exhaust header 487 and a transfer port connected by a line 503 to the forward end of the bridge cylinder 474. The valve 483 has a port connected by a line 504 to the line 495 which leads to the transfer port of valve 481, an exhaust port connected to the exhaust header 487 and a transfer port connected by a line 505 to the lower ends of the rear web clamp cylinders 417. The exhaust header 487 has a check valve 506 therein beyond all the valves to prevent entry of lint through the header into the valves.

Valve 480, when deenergized, connects pressure line 484 through the valve transfer port to line 488 and closes the valve outlet to the exhaust header 487. When energized, it connects line 488 through the transfer port to the exhaust header 487. Valve 481, when deenergized, connects line 495 through the valve transfer port to the exhaust header 487. When energized, it connects pressure line 499 through the transfer port to the line 495. Valve 482, when deenergized, connects line 503 through the valve transfer port to the exhaust header 487. When energized, it connects pressure line 502 through the transfer port to the line 503. Valve 483, when deenergized, connects line 505 through the valve transfer port to the exhaust header 487. When energized, it connects line 504 through the transfer port to line 505.

With all four valves 480, 481, 482 and 483 deenergized, air under pressure is supplied to the upper ends of the belt tensioning cylinders 333 from line 484 through valve 480, line 488, surge tank 490 and lines 491. The lower ends of the cylinders 333 are vented through lines 493, surge tank 492, line 495, and valve 481 to the exhaust header 487. This biases belt tightener pulleys 305 downward to take up slack in the belts 300 thereby to maintain them in tight frictional engagement with the periphery of the mill roll M as the latter decreases in diameter in unwinding. Also, air under pressure is supplied from line 488 through line 496 and branches 497 and 498 to the upper ends of web clamp cylinders 417 and 418. The lower end of the cylinder 417 is vented through line 505 and valve 483 to exhaust header 487. The lower end of the cylinder 418 is vented through line 501 to line 495 and thence through valve 481 to the exhaust header. Thus, the pistons 437 and 447 in cylinders 417 and 418 are retracted to maintain both the rearward and forward web clamps 433 and 443 in their raised retracted positions permitting free travel of the web W over the table 415. Also, air under pressure is supplied to the rearward end of bridge cylinder 474 through line 500. The forward end of the bridge cylinder is vented through line 503, and valve 482 to the exhaust header 487.

To release the tension on belts 300, both of valves 480 and 481 are energized. This supplies air under pressure from line 499 through the valve 481, line 495, surge tank 492 and lines 493 to the lower ends of belt-tensioning cylinders 333. It vents the upper ends of the cylinders through lines 491, surge tank 490, line 488 and valve 480 to the exhaust header 487. This moves belt tightener pulleys 305 upward to release the tension on the belts. Also, air under pressure is supplied from line 495 through line 501 to the lower ends of the forward web clamp cylinders 418 and air is vented from the upper ends of cylinders 418 through branch 498 and line 496 to line 488. This moves the forward web clamp 443 downward to clamp the web W against the table 415 to prevent slacking of the web in the apparatus when the tension on belts 300 is released. While this also vents the upper ends of the rear web clamp cylinders 417, it has no effect on the rear web clamp 433 since the lower ends of these cylinders are also vented through line 505. To operate the rear web clamp 433, the valve 483 is then energized. With valves 480 and 481 energized, this supplies air under pressure to the lower ends of the rear web clamp cylinders 417 from line 495 through line 504, valve 483 and line 505 to raise the pistons in cylinders 417 and thus to move the rear web clamp 433 downward to clamp the web W against the table 415.

It will be understood that valve 482, when deenergized, holds the piston 475 of the bridge cylinder 474 retracted to maintain the bridge 8 in retracted position under the table. To extend the bridge, valve 482 is energized. This supplies air under pressure from line 500 through line 502, valve 482 and line 503 to the forward end of cylinder 474. Since the area of the forward side of piston 475 exposed to this pressure is greater than the area of its rearward or piston rod side exposed to the same pressure from line 500, the piston is driven rearward to extend the bridge.

The whip roll adjusting cylinder 366 is connected in the high pressure oil system as illustrated in Fig. 32 under control of two solenoid valves 510 and 511. As shown, each of valves 510 and 511 has a pressure inlet connected to the pressure line 207 and an outlet connected to the return line 208. Valve 510 has a transfer port connected by a line 512 to the port 371 in the outer end of the cylinder 366. Valve 511 has a transfer port connected by a line 513 to the port 370 in the inner end of the cylinder. Valve 510, when deenergized, connects line 512 through the valve transfer port to return line 208 and, when energized, connects pressure line 207 through the transfer port to line 512. Valve 511, when deenergized, connects line 513 through the valve transfer port to return line 208 and, when energized, connects pressure line 207 through the transfer port to line 513. Thus, when both valves 510 and 511 are deenergized there is no pressure on either side of the piston 368 in cylinder 366 and the whip roll remains in the transverse position to which it has previously been adjusted. To shift the whip roll toward the left-hand side frame 9 (away from cylinder 366), valve 510 is energized, valve 511 being deenergized. This supplies oil under pressure from line 207 through the valve and line 512 to the outer end of the cylinder 366. Since the inner end of the cylinder is vented through line 513 and valve 511, which is deenergized, the whip roll is shifted away to the left from the cylinder until valve 510 is deenergized. To shift the whip roll toward the right-hand side frame 10 (toward the cylinder 366), valve 511 is energized, valve 510 being deenergized. This supplies oil under pressure from line 207 through the valve 511 and line 513 to the inner end of cylinder 366. Since the outer end of the cylinder is vented through line 512 and deenergized valve 510, the whip roll is shifted to the right until valve 511 is deenergized.

Fig. 33 diagrammatically illustrates the electrical controls for the driving motor 99 and the solenoid valves. Current is supplied to the motor from any suitable source 520 under control of a motor speed control unit 521. The latter is of a known type and includes controls for varying the supply of current to the motor selectively for jogging it, operating it at slow speed, and for operating it at high speed. A relay H has its coil connected in a line 522 across power lines L-1, L-2, and its contacts connected in a control circuit 523 coupled to the high or running speed control in the motor control unit 521. The line 522 includes in series two normally closed relay contactors T-1 and BR-1, the normally closed contacts 524 of one pole of a double-pole jogging control switch 525, a normally open push button start switch 526, and a normally closed push button stop switch 527. A jogging relay J has its coil connected in a line 528 shunted around the relay H, contactors T-1 and BR-1 and the start switch 526. The line 528 includes the normally open contacts 529 of the other pole of the jogging control switch 525. Jogging relay J has its contacts connected in a control circuit 530 coupled to the jogging control in the motor control unit 521. A slow speed control relay S has its coil connected in a line 531 shunted around the relay H. The line 531 includes a normally closed push button switch 532. Slow speed relay S has its contacts connected in a control circuit 533 coupled to the slow speed control in the motor control unit 521. The running relay H has a normally open contactor H-1 in a line 534 shunted around the start switch 526. This contactor closes when relay H is energized to establish a holding circuit so that the start switch may be released.

To jog the motor 99, jogging switch 525 is actuated to close the contacts 529 and complete a circuit through line 528 to energize the jogging relay J. Upon energization of relay J, control circuit 530 is completed and motor 99 is jogged. To stop the motor, the jogging switch is released. To operate the motor 99 at high running speed, start switch 526 is closed. This completes a circuit through line 522 including the coil of relay H, normally closed relay contactors T-1 and BR-1, the normally closed contacts 524 of the jogging switch 525, the start switch 526 and the normally closed stop switch 527. Relay H, thus energized, closes contactor H-1 to establish a holding circuit around the start switch so that it may be released. A circuit is also completed through line 531 including normally closed slow speed control switch 532 to energize relay S. With relays H and S energized, control circuits 523 and 533 are energized and motor 99 is operated at high speed. To slow the motor, switch 532 is opened. This deenergizes relay S, breaks the control circuit 533, and acts through unit 521 to slow down the motor. To stop the motor, stop switch 527 is opened.

A relay LC for controlling the operation of the fluid motor links 190 has its coil connected in a line 535 across power lines L-1 and L-2 including a normally open push button switch 536, a normally closed contactor H-2 of the relay H, and a normally closed push button switch 537. Relay LC has a normally open contactor LC-1 in a line 538 shunted around switch 536 and contactor H-2. When switch 536 is closed, a circuit is completed through the coil of relay LC to energize it. This closes contactor LC-1 to complete a holding circuit around the switch 536 so that the latter may be released. It will be noted that relay LC cannot be energized unless contactor H-2 is closed so that it cannot be energized unless relay H is deenergized. Thus, relay LC cannot be inadvertently energized while motor 99 is running, since relay H must be energized for motor 99 to run. To deenergize relay LC once it has been energized, switch 537 is opened to break the relay circuit. Solenoid valves 200 and 201, which control the motor links 190, are connected in parallel in a circuit 539 connected across the power lines L-1 and L-2 including a normally open contactor LC-2 of relay LC. Thus, when relay LC is deenergized, solenoids 200 and 201 are deenergized. When relay LC is energized by closing switch 536, contactor LC-2 closes and both solenoids 200 and 201 are energized.

A relay BR for controlling the operation of the bridge cylinder 474 has its coil connected in a line 540 across power lines L-1 and L-2 including a normally open push button switch 541, a normally closed push button switch 542 and a normally closed contactor H-3 of relay H. Relay BR has the normally closed contactor BR-1 in line 522, and a normally open contactor BR-2 in a line 543 shunted around switch 541. When switch 541 is closed, a circuit is completed through the coil of relay BR (assuming contactor H-3 to be closed) to energize relay BR. This closes contactor BR-2 to complete a holding circuit through line 543 around switch 541 so that the latter may be released. It also opens normally closed contactor BR-1 in line 522 so that relays H and S cannot be inadvertently energized when relay BR is energized. To deenergize relay BR once it has been energized, switch 542 is opened. Solenoid valve 482, which controls the operation of the bridge cylinder 474, is connected in a line 544 across the power lines L-1 and L-2 which includes a normally open contactor BR-3 of relay BR. Thus, when relay BR is deenergized, solenoid 482 is deenergized. When relay BR is energized, contactor BR-3 closes and solenoid 482 is energized to extend the bridge.

A relay T for controlling the operation of the belt tensioning cylinders 333 has its coil connected in a line 545 across power lines L-1 and L-2 including a normally open push button switch 546, a normally closed push button switch 547 and the contactor H-3. Relay T has the normally closed contactor T-1 in line 522 and a normally open contactor T-2 in a line 548 shunted around switch 546. When switch 546 is closed, a circuit is completed through the coil of relay T (assuming contactor H-3 to be closed) to energize relay T. This closes contactor T-2 to complete a holding circuit around switch 546 so that the latter may be released. It also opens contactor T-1 in line 522 so that relays H and S cannot be inadvertently energized when relay T is energized. To deenergize relay T once it has been energized, switch 547 is opened. Solenoid valves 480 and 481, which control the operation of the belt tensioning cylinders 333, are connected in parallel in a circuit 549 across power lines L-1 and L-2 including a normally open contactor T-3 of relay T. Thus, when relay T is deenergized, solenoids 480 and 481 are deenergized. When relay T is closed by closing switch 546, contactor T-3 closes and both solenoids 480 and 481 are energized.

The solenoid valves 510 and 511, which control the whip roll adjusting cylinder 366, are connected in lines 550 and 551 across power lines L-1 and L-2. Lines 550 and 511 include normally open push button switches 552 and 553, respectively, for alternatively energizing the solenoids 510 and 511. The solenoid valves 262 and 263 are connected in parallel in a circuit 560 including a double push button switch 561 and connected across power lines L-1 and L-2 through a line 562 including a normally open contactor T-4 of relay T. The arrangement is such that when relay T is energized and contactor T-4 is closed, both solenoids 262 and 263 may be energized by closing switch 561. The solenoid valves 264 and 265 are connected in parallel in a circuit 563 including a normally open push button switch 564 and connected across power lines L-1 and L-2 through the line 562 including contactor T-4. The arrangement is such that when relay T is energized and contactor T-4 is closed, both solenoids 264 and 265 may be energized by closing switch 564. The solenoid valves 266, 483 and 290 are connected in lines 565, 566 and 567, respectively, connected across power lines L-1 and L-2 through the line 562 including contactor T-4. Line 565 includes a normally open push button switch 568. Line 566 includes a double push button switch 569. Line 567 includes a normally open push button switch 570. None of solenoids 266, 483 and 290 can be energized unless contactor T-4 is closed. The solenoid valves 288 and 289 are connected in parallel in a circuit 571 including a double push button switch 572 and connected across power lines L-1 and L-2 through line 562 including contactor T-4. With T-4 closed, both solenoids 288 and 289 are energized upon closing switch 572.

The manual switches above the dash line in Fig. 33 are conveniently mounted in a control box at the forward end of the apparatus. Those below the dash line are conveniently mounted in a control box at the rearward end of the apparatus.

The arbor 2, upon which the strips issuing from the slitting rolls are wound, may have any suitable sectional arbor construction adapted for ready separation of the completed rolls of strip. As shown in Fig. 31, the arbor preferred for use with the apparatus of this invention comprises a shaft 600 having a length less than the spacing of the inside faces 601 of the side frames 9 and 10. Adjacent one end of the shaft 600 is pinned a collar 602. Stacked on the shaft in side-by-side relation are individual ribbon roll cores 603. The cores are clamped against the fixed collar 602 by means of a collar 604 threaded on shaft 600 adjacent its other end. Each strip or ribbon is wound on a core 603, the latter being of the same width as the strip. One of the inside faces 601 of the side frames may have a roll diameter scale 605 thereon (Fig. 12). On the rider drum frame 19 is a pointer 606 cooperable with the scale for indicating the diameter of the roll R.

Operation is as follows:

Assuming that a web W of minimum width (twenty-eight inches as herein illustrated) is to be slit into strips and the strips wound into rolls, a mill roll M of the minimum width web is positioned in the web roll stand 5 for unwinding. This operation is carried out with the motor 99 at rest, and with the tension on belts 300 released. To release the tension on the belts, switch 546 is closed to energize relay T and to maintain it energized. This closes contactor T-3, thereby energizing solenoid valves 480 and 481, and moves belt tightener pulleys 305 upward to release the tension on the belts as above described. It also moves the forward web clamp 443 downward, but this is of no significance at this time. It also opens contactor T-1 to prevent inadvertent running of motor 99. It also closes contactor T-4 to permit energization of solenoids 262, 263, 264, 265, 266, 483, 290, 288 and 289.

The mill roll holding frame 230 is then lowered into its mill roll receiving position of Fig. 2 by closing the switch 572. This energizes solenoid valves 288 and 289 to supply oil under pressure to the forward ends of mill roll lift cylinders 281 and vents their rearward ends thereby to lower the frame 230. As the frame is lowered, the mill roll core chucks 246 and 261 may be separated by closing switch 561. This energizes solenoid valves 262 and 263 to supply oil under pressure to the inner end of cylinder 235 and to vent its outer end thereby retracting chuck 246 as previously described. Meanwhile, the mill roll is positioned between the arms 233 and 234 of the frame 230, either by rolling it into position on the floor or by moving it into position on a truck. The frame 230 is lowered until the axis of the chucks coincides with the axis of the mill roll and may be stopped in accurately centered position by closing switch 570. This energizes solenoid valve 290 quickly to stop the frame without drifting as previously described.

The chucks 246 and 261 are then moved inward by opening switch 561 to deenergize solenoid valves 262 and 263. This causes the chucks 246 and 261 to move toward one another until they enter and engage the ends of the mill roll core, and then both chucks move toward the left-hand side frame 9 of the apparatus as previously explained until the end of the mill roll carried by the chuck 261 is longitudinally aligned with the index guide mark E on the idler guide roll 340 (Fig. 17). If the mill roll should not stop in such aligned position, it may be transversely shifted in one direction or the other as required by closing either switch 564 to energize solenoid valves 264 and 265 to shift the mill roll toward cylinder 236 or switch 563 to energize solenoid valve 266 to shift the mill roll toward cylinder 235. This shifting is accomplished as the mill roll is lifted to its raised unwinding position of Fig. 1. To lift the mill roll, switch 572 is opened to deenergize solenoid valves 288 and 289. This supplies oil under pressure to the rearward ends of the lift cylinders 281 and vents their forward ends so that piston rods 284 are retracted to raise the frame 230 and maintain it in raised position.

After the mill roll has been lifted to unwinding position, belts 300 are tensioned by opening switch 547 to deenergize the relay T. This closes contactor T-1 to permit energization of relay H so that the motor 99 may run. It opens contactor T-3 to deenergize solenoid valves 480 and 481, thereby moving belt tightener pulleys 305 downward as previously explained to take up slack in the belts and tighten them around the periphery of the mill roll. It also opens contactor T-4 to prevent inadvertent energization of any of solenoids 262, 263, 264, 265, 266, 483, 290, 288 and 289. With solenoid 481 deenergized, the forward web clamp 443 is raised. With solenoid 483 deenergized, the rear web clamp 433 is also raised.

The web W is then pulled from the mill roll and threaded through the apparatus around the rear idler guide roll 340, thence over the table 415 beneath the raised retracted knife blade 423 and the rear and forward web clamps 433 and 443, thence forward and around the whip roll 342, rearward and around the idler guide roll 343, downward and around the lower idler guide roll 188, and thence between the traction cutter drum 12 and the knife roll 17. The latter is retracted at this time to permit such threading. The end of the web is positioned to extend rearward from the top of the drum 12 and the arbor 2 is placed in position upon the web and cradled in the front drum 12 and the back drum 13. The latter is now in its most forward position determined by stops 18a. The rider drum, however, is in the retracted position of Fig. 13 as a result of having previously retracted the piston rods 192 into the linking cylinders 191 by closing switch 536 to energize the linking cylinder relay LC, thereby having closed contactor LC-2 and energized solenoid valves 200 and 201. The end of the web is wrapped forward around the arbor and at first simply left to extend forward, without being tucked under the arbor. The knife roll 17 is now moved into its slitting position. The rider drum is swung downward to engage the end portion of the web extending over the arbor by opening switch 537 to deenergize relay LC, thereby opening contactor LC-2 and deenergizing solenoid valves 200 and 201. This converts the linking cylinders 191 and their piston rods 192 to rigid links.

The whip roll 342 is then transversely adjusted into centered position with respect to the web by closing one or the other of switches 552 or 553 as required. Assuming that the whip roll needs to be shifted toward the left-hand side frame 9 for centering purposes, switch 552 is closed to energize solenoid 510, thereby shifting the whip roll toward the left as previously explained until it is centered in respect to the web as indicated by the pointer 372 on the web width scale 373 (Fig. 3). This moves the piston valve 404 to its outermost position (Fig. 23) wherein it supplies fluid under pressure to all six extra weights 379 to maintain them in raised position. The motor 99 is now jogged by actuating the jogging switch 529 to drive the traction cutter drum 12, the back drum 13, and the rider drum 14, thereby feeding the web forward without winding until slack is taken out of the web and the web is tensioned to a predetermined extent as indicated by the web tension indicator 369 (Fig. 3). This feeding of the web is continued until the beginning ends of the slits in the web travel out from between the rider drum 14 and the arbor. Then, the unslit forward end portion of the web is cut off close to the beginning ends of the slits, and the cut end of the web is tucked around and back under the arbor so that winding may be started. This leaves a very short uncut end portion at the forward end of the web (usually only about one-quarter inch long), but this is not objectionable as, being so short, it readily tears apart when the rolls of narrow strip are separated.

The operator then releases the jogging switch 529 and closes switch 526 to energize relays H and S (contactors T-1 and BR-1 being closed since relays T and BR are now deenergized). With relays H and S energized, motor 99 is operated at winding speed accordingly to drive the traction cutter drum 12, the back drum 13, the rider drum 14 and the knife roll 17. With relay H energized, contactors H-2 and H-3 are opened so that relays LC and BR cannot be inadvertently energized to adjust links 190 or extend the bridge 8. The drums 12, 13 and 14 peripherally drive the rolls of strip on the arbor 2 and pull the web W between the traction cutter drum and the knife roll where the web is slit into strips by the shearing action of the rotary cutters 15 of the cutter drum and the knives 16 of the knife roll.

As the roll R (consisting of the plurality of side-by-side rolls of strip) increases in diameter, it moves the rider drum 14 upward, pivoting the rider drum frame 19 away from the traction drum 12. As the frame 19 swings away from the traction drum 12, it swings the back drum frame 18 and the back drum 13 away from the drum 12 through the now rigid motor links 190. As the back drum frame 18 swings away from the drum 12, the cam plates 215 engage the counterweight chains 213 to move the chains and the counterweight 212 suspended on the chains toward the forward end of the apparatus. This gradually increases the effective moment of the counterweight tending to swing the back drum frame toward the traction roll so as to offset the moment of the weight of the roll R and thereby to maintain the rider drum 14 in pressure engagement with the roll. Since all six extra weights 379 are in raised position, none of them are added to the counterweight bar 375 as it swings forward. Thus, the counterweight 212 is appropriately weighted for winding the minimum width web.

When the strip roll R has been wound to the desired diameter (Fig. 12), as indicated by the pointer 606 on the scale 605, the motor 99 is stopped by opening stop switch 527, thereby deenergizing relays H and S. This closes contactors H-2 and H-3 so that relays LC and BR may be energized. The operator spreads a stripe of paste on the strips leading back over the front drum 12 to the roll, jogs the motor 99 to move the stripe of paste rearward past the drum 12, inserts a tearing wire between the roll and the strips leading over the front drum to the roll, and jogs the motor to bring the wire around to the forward side of the roll. The operator then tears the strips by means of the wire, leaving the ends of the strips in the wound roll pasted down to complete the individual rolls of strip, and leaving free the ends of the strips at the end of the web W.

Then, the bridge 8 is extended to its position wherein it bridges the space between the winder 1 and the table 7 (Fig. 13) by closing switch 541. This energizes relay BR, closing contactor BR-3 to energize solenoid valve 482 thereby to extend the bridge as previously described. It opens contactor BR-1 so that motor 9 cannot inadvertently be run while the bridge is extended. After the bridge has been extended, switch 536 is closed to energize relay LC. This closes contactor LC-2 and energizes solenoid valves 200 and 201. Upon energization of these solenoids, the piston rods 192 are retracted into the linking cylinders 191 (Fig. 13) as previously described. This returns the back drum 13 to its initial position and, in so doing, lifts the completed roll R into a position on the front drum 12 (Fig. 13), from which it may be readily rolled downward first over the cutter box cover 186 and then over the bridge on to the table 8. Here the collar 604 of the arbor 2 is removed and the individual rolls of strip split apart and slid off the end of the arbor shaft 600.

While the completed roll R is being separated into individual rolls of strip on the table 8, the bridge is retracted by opening switch 542 to deenergize relay BR, thereby opening contactor BR-3 and deenergizing solenoid valve 482. This closes contact BR-1 so that motor 99 may be run. Another arbor 2 is cradled in the front and back drums 12 and 13 on the strips extending out of the slitter 2, and the strips tucked around the arbor for winding another roll. Switch 537 is then opened to deenergize relay LC. This opens contactor LC-2 deenergizing solenoid valves 200 and 201, and drives piston rods 192 out of cylinders 191 to swing the rider drum frame 19 and the rider drum 14 toward the traction roll 12 until the rider roll bears against the arbor (Fig. 11). Then another roll is wound in the same manner as previously described.

Rolls R are wound from the web in the mill roll M until the mill roll is nearly exhausted. After the completion of the last roll wound from the mill roll, but before its ejection, the tension on the belts 300 is released by closing switch 546 to energize relay T as above described. This moves the forward web clamp 443 downward to clamp the web W upon the table 415. The operator then pulls down the knife 423 by means of handle bar 429 to sever the web at the edge of blade 425 constituting the rearward edge of the table, and then releases the knife. A new mill roll is positioned for unwinding in the web roll stand 5 in the manner above described. Paste is applied to the upper surface of the trailing end of the exhausting web rearward of the forward web clamp 443 and under the rearward web clamp 433, which is now raised. The leading end of the new web is pulled from the new mill roll, led over the idler guide roll 340 and overlapped with the paste-coated trailing end of the exhausting web. The rearward web clamp 433 is then moved downward to clamp the overlapped ends of the two webs against the table 415 for applying pressure to the pasted seam. This is accomplished by closing switch 569 to energize solenoid valve 483. With valve 483 energized, and with valves 480 and 481 energized as a result of having energized relay T, air under pressure is supplied to the lower ends of the rear web clamp cylinders 417 to raise their pistons and thus move the rear web clamp 433 downward.

Then, belts 300 are tensioned around the new mill roll by opening switch 547 to deenergize the relay T. This automatically opens contactors T-3 and T-4 to deenergize solenoid valves 480, 481 and 483 and thereby raises both the rear and forward web clamps 433 and 443. Motor 99 is jogged to pull the leading end of the new web through the slitter 2. The completed roll R is then ejected. The reach of web from the leading end of the exhausting web back to and including the pasted seam is cut off and discarded so that none of the strips in the strip rolls will have a pasted seam. Rolls R may then be wound from the new mill roll in the same manner as previously specified.

If webs of widths greater than the minimum width are to be slit into strips and the strips wound into rolls, the operation is the same as above described with the exception that extra weights 379 are automatically added to the counterweight bar 375 in accordance with the transverse shifting of the whip roll 342 to center it in respect to the web. Assuming for example, that the whip roll 342 has been previously moved to its extreme left-hand position to center it in respect to the minimum twenty-eight inch web, and that a thirty-four inch web is now to be slit and wound, the whip roll 342 will be shifted three inches to the right to center it in respect to the new web. This is accomplished by closing switch 553 to energize solenoid valve 511, releasing switch 553 when the whip roll is centered as indicated by the pointer 372 on scale 373. With the whip roll so centered, piston valve 404 is so positioned in weight control valve cylinder 403 as to vent three of the weight-lifting cylinders 383 to exhaust to lower their weights 379 on to the counterweight bar 375 while maintaining pressure in the other three cylinders 383 to hold their weights 379 in raised position.

The slitting and winding apparatus may be operated at high speeds to slit a web into narrow strips (for example, of the order of one-fourth inch in width) and wind the strips into uniform, tightly-wound disc-like rolls with flat sides. Since the rolls of strip are wound side-by-side in close contact on the arbor 2, rather than being axially spaced apart, the strips do not have to be fanned out laterally as they emerge from the slitter and both the width and length of the apparatus may therefore be kept at a minimum. Despite the side-by-side relation of the rolls of strip wound on the arbor 2, they do not stick together and may be readily separated. The cuts effected by the shearing action of the cutters 15 of the traction cutter drum 12 and the knives 16 of the knife roll 17 are clean and sharp. The knives 16, being in sidewise rather than edgewise engagement with the cutters 15, remain sharp. The knives 16 may be readily moved into and out of shearing relation with the cutters without any possibility of damage due to the provision for axial movement thereof as they are moved toward and away from the cutters. The provision of means for circulating a heat-exchange fluid through the cutter drum 12 and the knife roll 17 which together constitute the slitter prevents differential thermal variations in the dimensions of these parts to maintain them in uniform alignment with uniform sidewise pressures between mated cutters and knives. Rolls of strip may be quickly completed and ejected from the winder and another roll quickly started. Renewal of web rolls and threading of a new web through the apparatus is facilitated by the quickly adjustable web roll stand 5 and the web cutting and clamping apparatus 6. Webs of different widths are readily slit and wound in view of the provision of the readily adjustable whip roll and the automatic means for adding extra weights to the counterweight in proportion to the width of web to be slit and wound.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. Apparatus for slitting a web into strips and winding the strips into rolls on an arbor, comprising a friction drum type winder having a traction drum for peripherally supporting and frictionally driving said arbor and rolls of strip thereon, said traction drum comprising a plurality of coaxial axially spaced circular cutters raked toward one end of the drum and having co-cylindrical peripheries of substantial width for supporting and driving the rolls of strip on the arbor, and a knife roll comprising a plurality of coaxial circular sharp-edged knives spaced axially at intervals corresponding to the spacing of the cutters, each of said knives having a sharp radially outwardly presented knife edge defined by an annular flat on one side and a bevel on the other, said knife roll being positioned with the knives entered edgewise between the cutters and having their annular flats engaged with the sides of the cutters facing toward said one end of the traction drum.

2. Apparatus for slitting a web into strips and winding the strips into rolls on an arbor, comprising a friction drum type winder having a traction drum for peripherally supporting and frictionally driving said arbor and rolls of strip thereon, said traction drum having a plurality of coaxial axially spaced circular cutters raked toward one end of the drum and having co-cylindrical peripheries of substantial width for supporting and driving the rolls of strip on the arbor, and a knife roll having a plurality of coaxial axially spaced circular sharp-edged knives, each of said knives having a sharp radially outwardly presented knife edge defined by an annular flat on one side and a bevel on the other, said knife roll being mounted for axial and radial movement between a slitting position wherein said knives are entered between the cutters with their annular flats engaged sidewise with the sides of the cutters facing toward said one end of the traction drum, and a retracted position wherein the knives are spaced radially outward from the cutters and displaced axially toward said one end of the traction drum.

3. Apparatus for slitting a web into strips and winding the strips into rolls on an arbor, comprising a friction drum type winder having front and back traction drums for peripherally supporting and fractionally driving said arbor and rolls of strip thereon, said front drum having a plurality of coaxial axially spaced circular cutters raked toward one end of the drum and having co-cylindrical peripheries of substantial width for supporting and driving the rolls of strip on the arbor, and a knife roll forward of the front drum having a plurality of coaxial axially spaced circular sharp-edged knives, each of said knives having a sharp radially outwardly presented knife edge defined by an annular flat on one side and a bevel on the other, said knife roll being mounted for swinging movement toward and away from the cutters and for axial movement as it swings so as to be movable between a slitting position wherein said knives are entered between the cutters with their annular flats engaged sidewise with the sides of the cutters facing toward said one end of the front drum, and a retracted position spaced forward of the cutters and displaced axially toward said one end of the front drum, and mechanism operative on the knife roll for moving it axially as it swings.

4. Apparatus for slitting a web into strips and winding the strips into rolls on an arbor, comprising a friction drum type winder having a traction drum for peripherally supporting and frictionally driving said arbor and rolls of strip thereon, said traction drum comprising a plurality of coaxial axially spaced circular cutters raked toward one end of the drum and having co-cylindrical peripheries of substantial width for supporting and driving the rolls of strip, and a knife roll comprising a plurality of coaxial circular sharp-edged knives spaced axially at intervals corresponding to the spacing of the cutters, each of said knives having a sharp radially outwardly presented knife edge defined by an annular flat on one side and a bevel on the other, said knife roll being pivotally mounted for swinging movement toward and away from the cutters and for axial movement as it swings so as to be movable between a slitting position wherein said knives are entered edgewise between the cutters with their annular flats engaged sidewise with the sides of the cutters facing toward said one end of the traction drum and a retracted position spaced outward from the cutters and displaced axially toward said end of the traction drum, and mechanism for moving the knife roll axially as it swings comprising a threaded pivot for the knife roll rotarily and axially movable in a fixed nut.

5. Apparatus for slitting a web into strips and winding the strips into rolls on an arbor, comprising a friction drum type winder having a traction drum for peripherally supporting and frictionally driving said arbor and rolls of strip thereon, said traction drum comprising a plurality of coaxial axially spaced circular cutters raked toward one end of the drum and having co-cylindrical peripheries of substantial width for supporting and driving the rolls of strip, and a knife roll comprising a plurality of coaxial circular sharp-edged knives spaced axially at intervals corresponding to the spacing of the cutters, each of said knives having a sharp radially outwardly presented knife edge defined by an annular flat on one side and a bevel on the other, said knife roll being positioned with the knives entered edgewise between the cutters and having their annular flats engaged with the sides of the cutters facing toward said one end of the traction drum, said traction drum and knife roll being hollow for circulation of a heat-exchange fluid therethrough and being connected in a heat-exchange fluid circulating system for maintaining a substantially constant temperature differential between the traction drum and the knife roll.

6. Apparatus for slitting a web into strips and winding the strips into rolls on an arbor, comprising a friction drum type winder having a traction drum for peripherally supporting and frictionally driving said arbor and rolls of strip thereon, said traction drum comprising a plurality of coaxial axially spaced circular cutters raked toward one end of the drum and having co-cylindrical peripheries of substantial width for supporting and driving the rolls of strip, and a knife roll comprising a plurality of coaxial circular sharp-edged knives spaced axially at intervals corresponding to the spacing of the cutters, each of said knives having a sharp radially outwardly presented knife edge defined by an annular flat on one side and a bevel on the other, said knife roll being pivotally mounted for swinging movement toward and away from the cutters and for axial movement as it swings so as to be movable between a slitting position wherein said knives are entered edgewise between the cutters with their annular flats engaged sidewise with the sides of the cutters facing toward said one end of the traction drum and a retracted position spaced outward from the cutters and displaced axially toward said end of the traction drum, and mechanism for moving the knife roll axially as it swings comprising a threaded pivot for the knife roll rotarily and axially movable in a fixed nut, said traction drum and knife roll being hollow for circulation of oil therethrough and being connected in an oil circulating system comprising a sump and a pump for pumping oil from the sump through the traction drum and knife roll and back to the sump, said system including flexible fluid lines connected to the knife roll permitting movement thereof, thereby to maintain a substantially constant temperature differential between the traction drum and knife roll.

7. A rotary slitter comprising a cylindrical cutter roll having a plurality of coaxial axially spaced circular cutters, a cylindrical knife roll comprising a plurality of coaxial axially spaced circular knives adapted for shearwise cooperation with the cutters, said knife roll being journalled for rotation on an eccentric shaft and swingable in an arc about the axis of the shaft toward and away from the cutter roll, said shaft being mounted for axial movement and adapted to move the knife roll axially as it swings, and mechanism operative on the shaft as it rotates for moving the shaft and knife roll axially.

8. A rotary slitter comprising a cylindrical cutter roll having a plurality of coaxial axially spaced circular cutters raked toward one end of the roll, a cylindrical knife roll comprising a plurality of coaxial circular knives spaced axially at intervals corresponding to the spacing of the cutters, said knife roll being journalled for rotation on an eccentric shaft and swingable in an arc about the axis of the shaft toward and away from the cutter roll, said shaft having journals axially slidable in fixed bearings, one of said journals being threaded in a nut fixed to its bearings for moving said shaft axially in the direction of said one end of the cutter roll as the knife roll swings away from the cutter roll and for moving said shaft axially in the opposite direction as the knife roll swings toward the cutter roll to cause said knives to enter edgewise between the cutters and then move axially into sidewise engagement therewith.

9. A rotary slitter as set forth in claim 7, wherein said rolls are hollow and are connected in a heat-exchange fluid circulating system for circulating a heat-exchange fluid therethrough to maintain a substantially constant temperature differential between the rolls.

10. A rotary slitter as set forth in claim 7, wherein said rolls are hollow and are connected in a heat-exchange fluid circulating system for circulating a heat-exchange fluid therethrough to maintain a substantially constant temperature differential between the rolls, said system including flexible fluid lines connected to the knife roll for permitting movement of the knife roll.

11. A rotary slitter as set forth in claim 8, wherein said rolls are hollow and are connected in an oil circulating system comprising a sump and a pump for pumping oil from the sump through the rolls and returning it to the sump to maintain a substantially constant temperature differential between the rolls, said system including flexible oil lines connected to the knife roll permitting movement thereof.

12. A friction drum winder comprising a pair of roll-supporting and driving drums, one of which is journalled on a fixed horizontal axis and the other of which is mounted to be movable toward and away from said fixed drum, a roll diameter measuring member mounted to bear upon a roll being wound and to be moved away from said fixed drum as the diameter of the roll increases, and a linkage connecting said member to the movable drum to move it away from the fixed drum as a roll is wound.

13. A winder as set forth in claim 12 wherein said linkage is releasable to permit movement of said movable drum toward the fixed drum independently of said member for ejecting a wound roll from the winder over the fixed drum.

14. A winder as set forth in claim 12 wherein said linkage comprises motor mechanism adapted selectively to connect said movable drum and member for concurrent movement or positively to move the movable drum toward the fixed drum independently of said member for ejecting a wound roll from the winder over the fixed drum.

15. A friction drum winder comprising a pair of roll-supporting and driving drums, one of which is journalled on a fixed horizontal axis and the other of which is mounted to be movable toward and away from said fixed drum, a roll diameter measuring member mounted to bear upon a roll being wound and to be moved away from said fixed drum as the diameter of the roll increases, a linkage connecting said member to the movable drum to move it away from the fixed drum as a roll is wound, said movable drum being biased away from the fixed drum by the weight of a roll being wound and thereby biasing said member away from said fixed drum, and counterbiasing mechanism operative on said movable drum and member tending to bias them toward the fixed drum.

16. A winder as set forth in claim 15, wherein said counterbiasing mechanism includes a counterweight connected to said movable drum and member and movable to apply a gradually increasing counterbias tending to move them toward the fixed drum as the weight of the roll being wound increases.

17. A friction drum winder comprising front and back roll-supporting and driving drums, the front drum being fixed and the back drum being carried by a frame pivoted to swing the back drum toward and away from the front drum, a rider drum carried by a frame pivoted to swing the rider drum toward and away from the front drum from above the latter and adapted to bear on a roll being wound, a linkage connecting said back and rider drum frames for movement of both said back and rider drums away from the front drum upon increase in diameter of the roll being wound, said back drum being biased away from the front drum by the weight of the roll and thereby biasing said rider drum away from the front drum through said linkage, and counterbiasing mechanism operative on said frames for biasing the back and rider drums toward the front drum.

18. A winder as set forth in claim 17 wherein said linkage comprises double-acting reciprocating fluid motor means including a cylinder connected to one of said frames and a piston connected to the other of said frames.

19. A winder as set forth in claim 17 wherein said counterbiasing mechanism comprises a counterweight carried by the back drum frame and movable by the back drum frame to apply a gradually increasing counterbias tending to move the back drum frame, the back drum, the rider drum frame and the rider drum toward the front drum as the weight of the roll increases with its increase in diameter.

20. A winder as set forth in claim 17 wherein said counterbiasing mechanism comprises a counterweight carried by the back drum frame and movable by the back drum frame to apply a gradually increasing counterbias tending to move the back drum frame, the back drum, the rider drum frame and the rider drum toward the front drum as the weight of the roll increases with its increase in diameter, and further including a reciprocating fluid motor connected to the back drum frame to bias the latter and the back drum toward the front drum.

21. A winder as set forth in claim 17, wherein said counterbiasing mechanism comprises a counterweight suspended by cables from the back drum frame to apply a moment thereto tending to swing it toward the front roll, and cams on the back drum frame engageable with the cables to increase the moment arm of the counterweight as the back drum frame swings away from the front drum.

22. A friction drum winder for winding webs of different widths, comprising a traction drum rotary on a fixed horizontal axis, caging drums for confining a roll being wound against the traction drum mounted for movement away from the traction drum as the diameter of the roll increases, a counterweight connected to said caging drums to bias them toward the traction drum, a set of extra weights each carried by a weight-loading mechanism in position for addition to the counterweight, a member adjustable to different positions in accordance with the width of web to be wound, and weight-control mechanism operable in response to movement of said member to any one of said positions for controlling said weight-loading mechanisms to add extra weights from said set to the counterweight in proportion to the width of web to be wound.

23. A friction drum winder for winding webs of different widths, comprising a traction drum rotary on a fixed horizontal axis, caging drums for confining a roll being wound against the traction drum mounted for movement away from the traction drum as the diameter of the roll increases, a counterweight connected to said caging drums to bias them toward the traction drum, an arm pivoted adjacent the counterweight, a set of extra weights each detachably suspended from the pivoted arm in position to be lowered on to the counterweight when the latter is in an initial position at the start of winding, a fluid pressure lift cylinder for each of said arms, a web guide roll adjustable transversely to the direction of web travel to center it in respect to webs of different widths, and a valve actuated by said guide roll and controlling the supply of pressure fluid to said cylinders to lower extra weights on to the counterweight in proportion to the width of web to be wound as determined by the centered position of said guide roll.

24. A rotary slitter comprising a cylindrical cutter roll having a plurality of coaxial axially spaced cutters, a shaft extending parallel to the cutter roll and adjacent thereto, said shaft being mounted at its ends in bearings for rotation about its axis and also for longitudinal sliding movement in the bearings, a hollow cylindrical knife roll journalled on the shaft for rotation relative to the shaft on an axis offset from and parallel to the shaft axis, the shaft extending through the knife roll, the knife roll having a plurality of coaxial circular knives spaced axially at intervals corresponding to the spacing of the cutters, the knife roll being swingable in an arc about the axis of the shaft toward and away from the cutter roll by rotating the shaft.

25. A rotary slitter as set forth in claim 24 further comprising mechanism operative on the shaft as it is rotated to move the shaft and the knife roll axially.

26. A rotary slitter as set forth in claim 24, wherein one end of the shaft is threaded in a nut fixed to the bearing for said end of the shaft for moving the shaft and the knife roll axially as the shaft is rotated.

27. A rotary slitter comprising a cylindrical cutter roll having a plurality of coaxial axially spaced circular cutters raked toward one end of the roll, a shaft extending parallel to the cutter roll and adjacent thereto, said shaft being mounted at its ends in bearings for rotation about its axis and also for longitudinal sliding movement in the bearings, a hollow cylinder journalled on the shaft for rotation relative to the shaft about an axis offset from and parallel to the shaft axis, the shaft extending through the cylinder, a plurality of circular knives each having a central cylindrical hub fitted coaxially on the cylinder with the knives spaced apart at intervals corresponding to the spacing of the cutters, the cylinder and knives being swingable in an arc about the axis of the shaft by rotating the shaft and also being longitudinally slidable for movement between a slitting position wherein the knives are entered edgewise between the cutters and engaged sidewise with the sides of the cutters toward said one end of the cutter roll and a retracted position withdrawn from between the cutters and displaced axially toward said one end of the cutter roll.

28. A rotary slitter as set forth in claim 27 further comprising mechanism operative on the shaft as it is rotated to move it axially concurrently with its rotation between its slitting and retracted positions.

29. A rotary slitter as set forth in claim 27, wherein one end of the shaft is threaded in a nut fixed to the bearing for said end of the shaft for moving the shaft axially concurrently with rotation thereof between its slitting and retracted positions.

THOMAS M. SCRUGGS.
EARL K. HALL.

REFERENCES CITED

The following references are of record in the file of this patent:

UNITED STATES PATENTS

| Number | Name | Date |
|---|---|---|
| 131,103 | Kearney | Sept. 3, 1872 |
| 437,896 | Kaffenberger | Oct. 7, 1890 |
| 783,951 | Hayes | Feb. 28, 1905 |
| 808,883 | Stilwell | Jan. 2, 1906 |
| 1,319,301 | Nall | Oct. 21, 1919 |
| 1,347,536 | Downie | July 27, 1920 |
| 1,468,839 | Sheehan | Sept. 25, 1923 |
| 1,505,425 | Raber | Aug. 19, 1924 |
| 1,538,887 | Carpenter | May 26, 1925 |
| 1,567,919 | Cumfer | Dec. 29, 1925 |
| 1,758,176 | Scott | May 13, 1930 |
| 1,853,292 | Wood | Apr. 12, 1932 |
| 1,929,087 | Wood | Oct. 3, 1933 |
| 1,937,412 | Roesen | Nov. 28, 1933 |
| 1,950,538 | Bernard | Mar. 13, 1934 |
| 1,955,917 | Jung | Apr. 24, 1934 |
| 1,986,680 | Marcalus | Jan. 1, 1935 |
| 2,012,118 | Cameron | Aug. 20, 1935 |
| 2,064,638 | Wheldon | Dec. 15, 1936 |
| 2,082,633 | Johnstone | June 1, 1937 |
| 2,082,634 | Johnstone | June 1, 1937 |
| 2,355,318 | Moravek | Aug. 8, 1944 |
| 2,364,201 | Fankbones | Dec. 5, 1944 |
| 2,367,974 | Stocker | Jan. 23, 1945 |
| 2,480,591 | Mitchell | Aug. 30, 1949 |

FOREIGN PATENTS

| Number | Country | Date |
|---|---|---|
| 1,390 | Great Britain | Jan. 20, 1896 |